United States Patent
Stanfill

(10) Patent No.: US 9,251,225 B2
(45) Date of Patent: Feb. 2, 2016

(54) MAPPING ENTITIES IN DATA MODELS

(71) Applicant: Ab Initio Technology LLC, Lexington, MA (US)

(72) Inventor: Craig W. Stanfill, Lincoln, MA (US)

(73) Assignee: AB INITIO TECHNOLOGY LLC, Lexington, MA (US)

( * ) Notice: Subject to any disclaimer, the term of this patent is extended or adjusted under 35 U.S.C. 154(b) by 72 days.

(21) Appl. No.: 13/949,761

(22) Filed: Jul. 24, 2013

(65) Prior Publication Data

US 2014/0032617 A1 Jan. 30, 2014

Related U.S. Application Data

(60) Provisional application No. 61/675,053, filed on Jul. 24, 2012.

(51) Int. Cl.
*G06F 17/30* (2006.01)

(52) U.S. Cl.
CPC ................ *G06F 17/30557* (2013.01)

(58) Field of Classification Search
CPC ................ G06F 17/30; G06F 17/00
USPC .................................. 707/600–899
See application file for complete search history.

(56) References Cited

U.S. PATENT DOCUMENTS

| | | | |
|---|---|---|---|
| 6,035,300 A | 3/2000 | Cason et al. | |
| 2005/0125432 A1* | 6/2005 | Lin et al. | 707/101 |
| 2006/0235900 A1* | 10/2006 | Anonsen | 707/200 |
| 2009/0012983 A1 | 1/2009 | Senneville et al. | |
| 2009/0083313 A1 | 3/2009 | Stanfill et al. | |
| 2010/0138388 A1 | 6/2010 | Wakeling et al. | |
| 2011/0179014 A1 | 7/2011 | Schechter et al. | |
| 2012/0284255 A1 | 11/2012 | Schechter et al. | |
| 2013/0290292 A1 | 10/2013 | Weyerhaeuser et al. | |
| 2013/0290298 A1 | 10/2013 | Weyerhaeuser et al. | |

FOREIGN PATENT DOCUMENTS

| | | |
|---|---|---|
| WO | 2007/002647 A2 | 1/2007 |
| WO | 2008/124319 A1 | 10/2008 |

OTHER PUBLICATIONS

Dweib et al. "MAXDOR: Mapping XML Document into Relational Database" *The Open Information Systems Journal*, 3: 108-122 (2009).

(Continued)

*Primary Examiner* — Isaac M Woo
(74) *Attorney, Agent, or Firm* — Occhiuti & Rohlicek LLP

(57) ABSTRACT

Mapping information that specifies attributes of destination entities in terms of attributes of source entities is received. At least some source entities correspond to respective sets of records in one or more data storage systems. The mapping information is processed to generate a procedural specification for computing values corresponding to attributes of destination entities. Collections of nodes are generated, each including a first node representing a first relational expression associated with a specified attribute. At least some collections form a directed acyclic graph that includes links to one or more other nodes representing respective relational expressions associated with at least one attribute of at least one source entity referenced by a relational expression of a node in the graph. At least two of the collections are merged with each other to form a third collection based on comparing relational expressions of nodes being merged.

56 Claims, 16 Drawing Sheets

(56) References Cited

OTHER PUBLICATIONS

Ballard et al. "InfoSphere DataStage for Enterprise XML Data Integration" *IBM Redbooks, International Technical Support Organization*, pp. 1-404 (May 2012).

Rull et al. "MVT: A Schema Mapping Validation Tool" *Proceedings of the International Conference on Extending Database Technology: Advances in Database Technology*, pp. 1120-1123 (Mar. 2009).

International Search Report and Written Opinion, PCT/US2013/051837, mailed May 30, 2014 (3 pages).

* cited by examiner

MAPPING ENTITIES IN DATA MODELS

CROSS-REFERENCE TO RELATED APPLICATIONS

This application claims priority to U.S. Application Ser. No. 61/675,053, filed on Jul. 24, 2012, incorporated herein by reference.

BACKGROUND

This description relates to mapping entities in data models.

In information systems, data models are used to describe data requirements, types of data and data computations that, for example, are being processed or stored in a database. Data models include entities and relationships between the entities defined by one or more schemas. In general, entities are abstractions of items in an information domain that are capable of independent existence or can be uniquely identified. Relationships capture how two or more entities may be related to one another. For example, while relationships can be thought of as being verbs, entities can be thought of as being nouns. A schema represents a particular collection of entities and relationships among them.

Complex computations involving data associated with data models can be performed using various database operations such as join or aggregation (or "rollup") operations. These computations can be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS.

SUMMARY

In one aspect, in general, a method for processing data in one or more data storage systems includes: receiving mapping information that specifies one or more attributes of one or more destination entities in terms of one or more attributes of one or more source entities, at least some of the one or more source entities corresponding to respective sets of records in the one or more data storage systems; and processing the mapping information to generate a procedural specification for computing values corresponding to at least some of the one or more attributes of one or more destination entities. The processing includes generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph. The processing also includes merging at least two of the collections with each other to form a third collection based on comparing relational expressions of nodes being merged.

Aspects can include one or more of the following features.

The mapping information includes a first mapping rule that defines a value of an attribute of a destination entity in terms of a value of an attribute of a first source entity and a value of an attribute of a second source entity.

A first collection of nodes associated with the first mapping rule includes: a first node representing a first relational expression including a relational algebra operation that references the first source entity and the second source entity, a second node linked to the first node representing a relational expression including the first source entity, and a third node linked to the first node representing a relational expression including the second source entity.

The mapping information includes a second mapping rule that defines a value of an attribute of a destination entity in terms of a value of an attribute of the first source entity.

The merging includes merging the first collection with a second collection of one or more nodes associated with the second mapping rule, including merging the second node with a node of the second collection representing a relational expression that includes the first source entity.

The relational algebra operation is a join operation.

The relational algebra operation is an aggregation operation.

The first source entity and the second source entity are related according to a relationship defined in a schema.

The schema includes multiple entities, and relationships between the entities include one or more of: a one-to-one relationship, a one-to-many relationship, or a many-to-many relationship.

Generating the procedural specification includes generating a dataflow graph from the third collection, the dataflow graph including components configured to perform operations corresponding to relational expressions in respective nodes of the third collection, and links representing flows of the records between output and input ports of components.

Generating the procedural specification includes generating a query language specification from the third collection, the query language specification including query expressions to perform operations corresponding to relational expressions in respective nodes of the third collection.

Generating the procedural specification includes generating a computer program from the third collection, the computer program including functions or expressions to perform operations corresponding to relational expressions in respective nodes of the third collection.

The computer program is specified in at least one of the programming languages: Java, C, C++.

The method further includes processing the records in the data storage system according to the procedural specification to compute values corresponding to at least some of the one or more attributes of one or more destination entities.

In another aspect, in general, a computer-readable storage medium stores a computer program for processing data in one or more data storage systems. The computer program includes instructions for causing a computing system to: receive mapping information that specifies one or more attributes of one or more destination entities in terms of one or more attributes of one or more source entities, at least some of the one or more source entities corresponding to respective sets of records in the one or more data storage systems; and process the mapping information to generate a procedural specification for computing values corresponding to at least some of the one or more attributes of one or more destination entities. The processing includes generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph. The processing also includes merging at least two of the collections with each other to form a third collection based on comparing relational expressions of nodes being merged.

In another aspect, in general, a computing system includes: one or more data storage systems; an input device or port receiving mapping information that specifies one or more attributes of one or more destination entities in terms of one or more attributes of one or more source entities, at least some of the one or more source entities corresponding to respective sets of records in the one or more data storage systems; and at least one processor configured to process the mapping information to generate a procedural specification for computing values corresponding to at least some of the one or more attributes of one or more destination entities. The processing includes generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph. The processing also includes merging at least two of the collections with each other to form a third collection based on comparing relational expressions of nodes being merged.

In another aspect, in general, a computing system includes: one or more data storage systems; means for receiving mapping information that specifies one or more attributes of one or more destination entities in terms of one or more attributes of one or more source entities, at least some of the one or more source entities corresponding to respective sets of records in the one or more data storage systems; and means for processing the mapping information to generate a procedural specification for computing values corresponding to at least some of the one or more attributes of one or more destination entities. The processing includes generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph. The processing also includes merging at least two of the collections with each other to form a third collection based on comparing relational expressions of nodes being merged.

Aspects can have one or more of the following advantages.

Techniques for generating a procedural specification, for example, in the form of an executable module (e.g., a dataflow graph), enable data-related problems to be expressed based on a mapping between a source schema and a destination schema. User input can be specified at a high level of abstraction by enabling attributes of entities in a desired destination schema to be expressed based on attributes of entities in an existing source schema. For example, a user is able to express a rule based on data from a dataset that also references auxiliary information from other sources without having to manually build a dataflow graph for extracting the auxiliary information from those sources. The user input defines the destination schema, which is processed to provide the procedural specification for extracting all the information needed from any entity in one or more source schemas.

Other features and advantages of the invention will become apparent from the following description, and from the claims.

DESCRIPTION

In information systems, a statement of a problem to be solved using data and computations on the data can be received in various forms. The data and computations can correspond to entities and relationships between the entities (such as an ER diagram). Typically, the problem statement is broken down or transformed by users into primitive forms of data and expressions using, for example, a complex query language. In some implementations, a system is able to generate dataflow graphs or query language expressions directly from the original problem statement. In this regard, systems and methods are described for automatically breaking down a problem statement into, for example, sets of joins, rollups, and other data transformations that are part of the generated graphs or expressions. In addition, the systems and methods can reference auxiliary information stored in, for example, external databases or files.

Figure 1A:
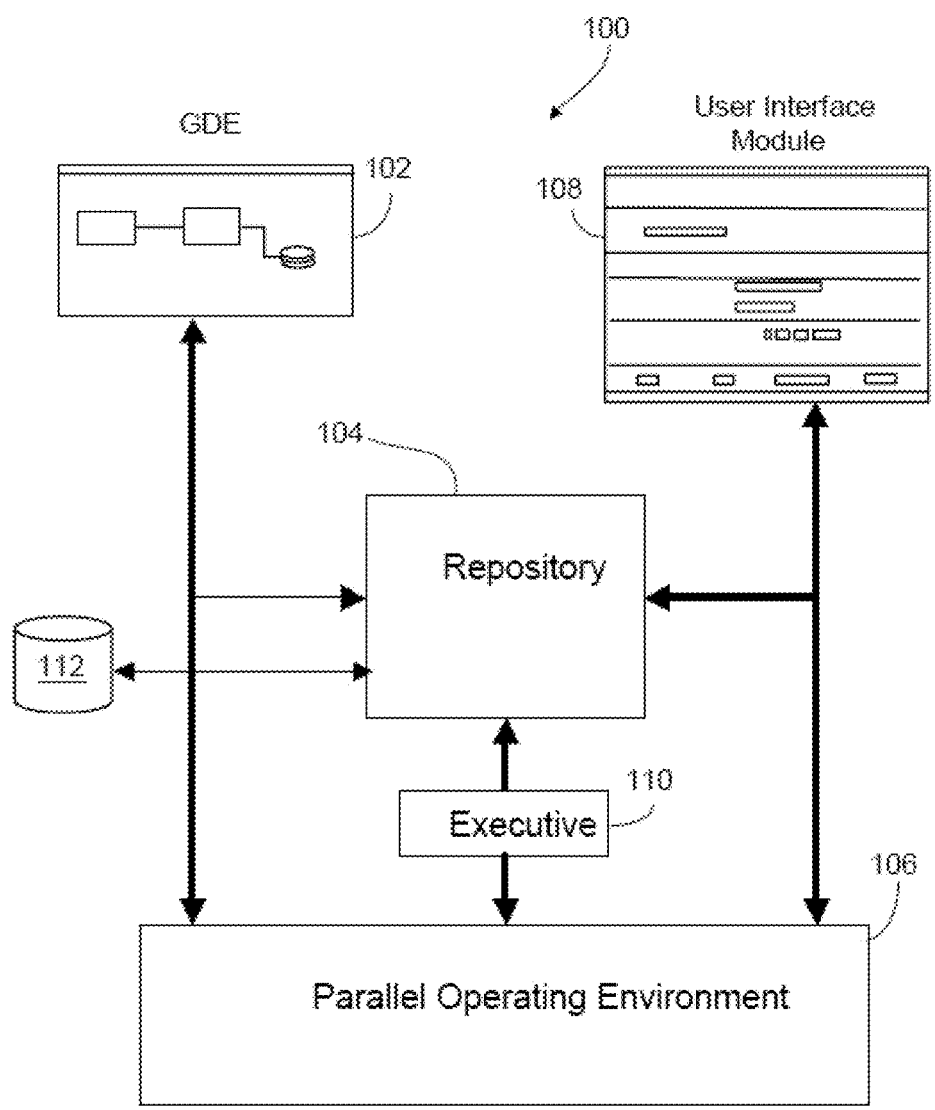
FIG. 1A is a block diagram of an example computing system for managing graph-based computations.

FIG. 1A is a block diagram showing the interrelationship of parts of a computing system 100 for developing, executing and managing graph-based computations. A graph-based computation is implemented using a "dataflow graph" that is represented by a directed graph, with vertices in the graph representing components (e.g., vertices representing components that have either source or sink operator type such as datasets, or vertices representing components that perform an operation on data according to a specified operator type), and the directed links or "edges" in the graph representing flows of data between components. A graphic development environment (GDE) 102 provides a user interface for specifying executable dataflow graphs and defining parameters for the dataflow graph components. The GDE 102 communicates with a repository 104 and a parallel operating environment 106. Also coupled to the repository 104 and the parallel operating environment 106 are a User Interface module 108 and an executive 210. The executive 210 controls execution of dataflow graphs in the parallel operating environment 106. Data flow graphs may also be generated using software application programming interfaces (APIs), without requiring interaction with the GDE 102.

The repository 104 is a scalable object-oriented database system designed to support the development and execution of graph-based applications and the interchange of metadata between the graph-based applications and other systems (e.g., other operating systems). The repository 104 is a storage system for all kinds of metadata, including documentation, record formats (e.g., fields and data types of records in a table), transform functions, dataflow graph specifications, and monitoring information. The repository 104 also stores data objects and entities that represent actual data to be processed by the computing system 100 including data stored in an external data store 112.

The parallel operating environment 106 accepts a specification of a dataflow graph generated in the GDE 102 and executes computer instructions that correspond to the processing logic and resources defined by the dataflow graph. The operating environment 106 may be hosted on one or more general-purpose computers under the control of a suitable operating system, such as the UNIX operating system. For example, the operating environment 106 can run on a multiple-node parallel computing system including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The User Interface module 108 provides a web-browser-based view of the contents of the repository 104. Using the User Interface module 108, a user may, among other things, browse objects, create new objects, and alter existing objects. A user can view and optionally, edit information contained in and/or associated with the stored data objects through the User Interface module 108.

The executive 110 is an optional repository-based job scheduling system accessed through the User Interface module 108. The executive 110 maintains jobs and job queues as objects within the repository 104, and the User Interface module 108 provides a view of and facilities to manipulate jobs and job queues.

One example of the system 100 for generating and executing dataflow graphs has the following features. (Other examples of systems are also possible with fewer than all of these features.)

- Each vertex in a dataflow graph represents a component that applies a specified operator to data, and the vertices are connected by directed links representing flows of data (called "data flows") between components.
- Each component has at least one named connection point, called a "port," and the operator of a component operates on input data flowing into one or more "input ports," and/or provides output data flowing out from one or more "output ports."
- Each port is associated with a data format that defines the format of data items flowing into or out of that port (e.g., for a flow of records, the data format may include a record format that defines the format of records as the individual data items).
- Each port has a permitted cardinality, which is a restriction on the number of data flows that may be connected to the port. For example, a permitted cardinality for a port may only allow a single data flow to be connected to it, or it may allow multiple data flows to be connected to it.
- Each data flow in a graph connects the output port of one component to the input port of another. Those two ports are associated with identical data formats.
- The system 100 can prevent cycles in dataflow graphs. If it is possible to trace a path from a vertex in a dataflow graph back to itself by traversing the data flows, then that particular dataflow graph can be designated as having a cycle and can be prohibited from executing.
- The operator of a component has an operator type that specifies a type of operator that is applied by that component (e.g., an "Input File" operator type is used for an operator that reads an input file, and a "Rollup" operator type is used for a component that applies a rollup operator).
- The operator may also be associated with parameters that are used to configure the operator. For example, an Input File operator can have a parameter providing the name of the input file to be read. The set of supported parameters depends on the operator type.
- The set of input and output ports supported by a component is determined by the operator type of that component. The operator type may also determine the permitted cardinality for the supported ports.
- A component may have a customizable label to identify the component, and may appear on a vertex that represents that component in a visual representation of a dataflow graph. The label may be different than the operator type, and may be used to uniquely identify the component within the dataflow graph.
- A port may have a customizable label to identify the port, and may appear on a visual representation of the port on a visual representation of its component. The label may be used to uniquely identify the port within the component.

Figure 1B:
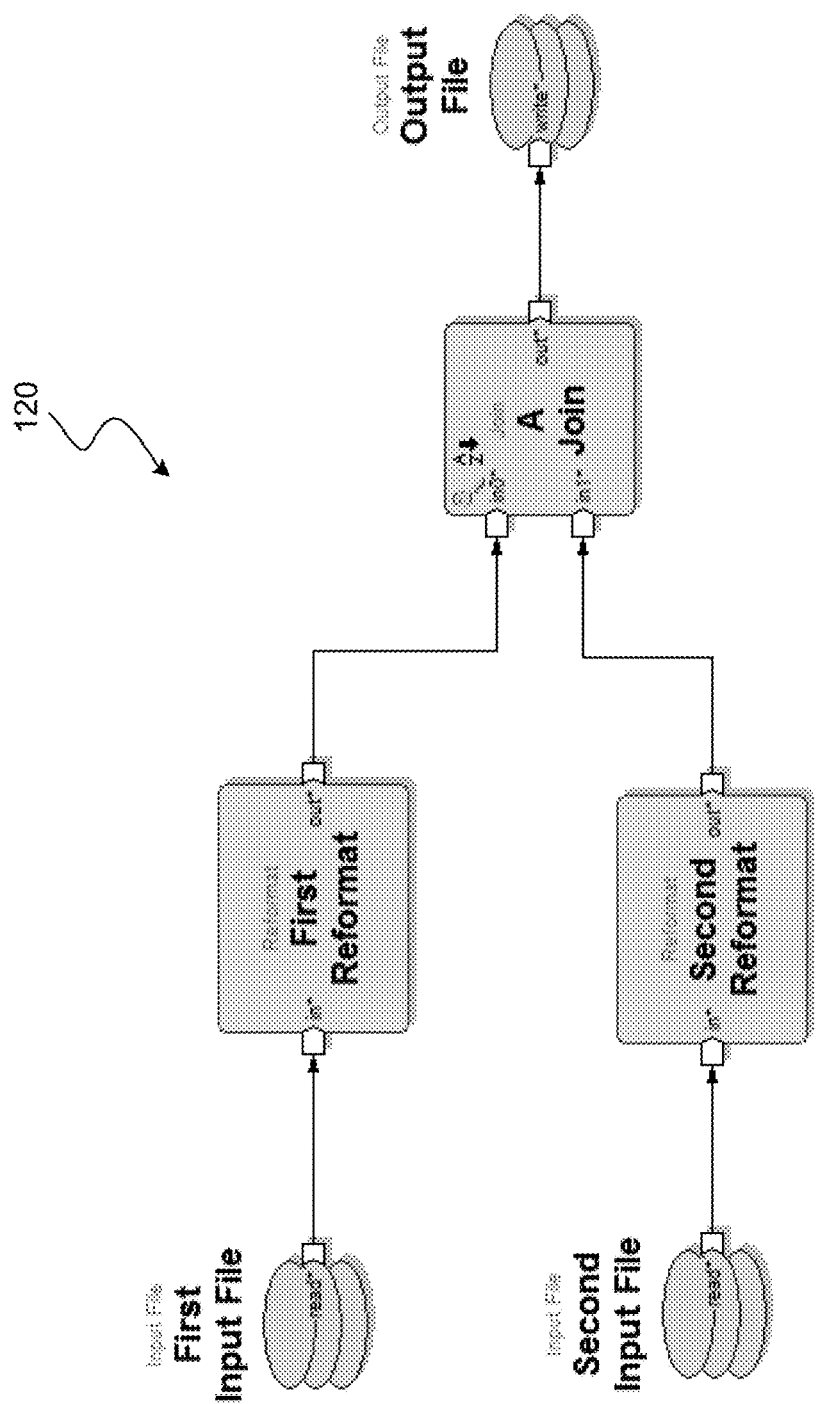
FIG. 1B shows an example of a dataflow graph.

Referring to FIG. 1B, an example of a visual representation of a dataflow graph 120 includes two components with an "Input File" operator type, and labels "First Input File" and "Second Input File," respectively. Each component has a single output port labeled "read." The dataflow graph 120 includes two instances of components with a "Reformat" operator type and labels "First Reformat" and "Second Reformat," respectively. Each Reformat component has a single input port labeled "in" and a single output port labeled "out." The dataflow graph 120 includes a single instance of a component with a "Join" operator type and a label "A Join." The Join component has two input ports labeled "in0" and "in1," respectively, and a single output port labeled "out." The dataflow graph 120 includes an instance of a component with an "Output File" operator type and a label "Output File." The dataflow graph 120 includes five data flows that link various ports. The varying visual appearance of the components (e.g., based on the operator type) is for the benefit of a developer or user.

When executing dataflow graphs, the system 100 performs certain actions associated with semantics of a dataflow graph. For example, a data flow represents an ordered set of data items, with each data item conforming to the data format associated with the ports that the dataflow connects. A component (executed by a process or thread, for example) reads the data items from its input port(s) (if any), performs a computation associated with applying its operator, and writes data to its output port(s) (if any). In some cases, the component also accesses external data (e.g., reading or writing a file or accessing data in a database). The computation associated with applying an operator may be determined by the data items (if any) read from any input port(s), parameters associated with the operator, and/or the state of any external data (e.g., files or database tables) accessed by the component. If a component writes data items to an output port, these data items will be communicated to any input ports connected to it, and thus used as the input to operators of downstream components. The associated order of the data items represented by a data flow may correspond to the order in which the data items are communicated between an output port and an input port, and possibly (though not necessarily) the order in which the data items are computed.

An example of a data format for a port is a record format, which defines the data types of the individual values within a given record, each value being identified by some identifier. The syntax of a record format may conform to a particular language. The following is an example of a syntax of a record format in a data manipulation language (DML).

```
record
  <data type 1> <identifier 1>;
  <data type 2> <identifier 2>;
end;
```

An example of a data type is "int" which defines the value identified by the identifier that follows it as an integer in a native binary format. The system 100 may support a wide variety of data types, but for purposes of illustration the "int" data type will be used in the examples herein. An example of a record format that uses this DML syntax is the following.

```
record
  int a1;
  int a2;
  int a3;
end;
```

This record format corresponds to a record composed of three consecutively allocated binary integers, identified as a1, a2, and a3.

The system 100 also supports a wide variety of operator types for components. For purposes of illustration, the following operator types are described: Input File, Output File, Input Table, Output Table, Reformat, Replicate, Join, and Rollup.

An Input File component has a single output port labeled (by default) "read" and a single parameter that identifies a file to be read (i.e., a "Filename" parameter). The read port may be connected to one or more data flows. The record format associated with the read port (i.e., read.format) is selected (e.g., by a developer or determined automatically) to correspond to the actual record format of records in the identified file. The operator that is applied by the Input File component reads successive records of the identified file (i.e., records having the record format associated with the read port), and provides them to the read port (e.g., by writing them to a particular buffer, or by some other communication mechanism).

For example, an Input File component may be configured as follows.

```
Operator type: Input File
Filename: A.dat
read.format:   record
                 int a1;
                 int a2;
                 int a3;
               end;
```

To ensure that the Input File component is able to successfully read the identified file and provide the records contained in the file to the read port, the physical record format actually used by the records in the file A.dat should match the provided record format read.format.

An Output File component has a single input port labeled (by default) "write" and a single parameter that identifies a file to be written (i.e., a "Filename" parameter). The write port may be connected to no more than one data flow. The record format associated with the write port (i.e., read.format) is selected (e.g., by a developer or determined automatically) to correspond to the actual record format of the records in the identified file. The operator that is applied by the Output File component receives successive records provided to the write port (e.g., by reading them from a particular buffer, or by some other communication mechanism), and writes them to the identified file.

There are other operator types for accessing data that is stored in media other than files, such as the "Input Table" and "Output Table" operator types, which may be used to access data that is stored in tables of relational databases, for example. The configuration and operator functionality for these other operator types are similar to those described above for the Input File and Output File operator types.

A Reformat component has a single input port labeled (by default) "in" and a single output port labeled (by default) "out" and a single parameter, which defines the operator of the component as a transformation function to be performed on each input record received at the in port yielding an output record provided to the out port.

The transformation function can be defined by the parameter of a Reformat component using the following syntax, which uses multiple entries for defining expressions for each of a number of output fields.

```
out :: reformat(in) =
begin
  out.<field1> :: <expression1>;
  out.<field2> :: <expression2>;
end;
```

Each field is the name of a field in the record format of the out port. Each expression is an expression composed of literals (e.g., numbers such as 1, 2, 3), input fields (e.g., in.a1), and any of a variety of algebraic operators such as operators for addition (+) and multiplication (*). Expressions are only allowed to refer to fields that are present in the input record format. A transformation function generally provides a single expression for each field in the output record format, but there may be procedures for determining default values for fields present in the output record format that are not included in the transformation function.

For example, a Reformat component may be configured as follows.

```
Operator Type:   Reformat
in.format:       record
                   int a1;
                   int a2;
                   int a3;
                 end;
out.format:      record
                   int a1;
                   int a2;
                   int a4;
                 end;
transformation:  out :: reformat(in) =
                 begin
                   out.a1 :: in.a1;
                   out.a2 :: in.a2;
                   out.a4 :: in.a1 * in.a3;
                 end;
```

A Replicate component is able to generate multiple copies of each input record, and has a single input port labeled (by default) "in" and a single output port labeled (by default) "out." Multiple data flows may be connected to the out port.

A Join component, which applies a join operator, has two input ports labeled (by default) "in0" and "in1" and one output port labeled (by default) "out." A Join component has two parameters, key0 and key1, which specify the fields to be used as key fields of the join operator. The join operator is associated with a transformation function that maps fields in the records of the input ports in0 and in1 to fields in the records of the out port. While the transformation function for a Reformat component has a single argument, the transformation function for a Join component has two arguments. Otherwise, the syntax of the transformation function for a Join component is similar to that of the transformation function for a Reformat component.

The join operator is applied by the Join component by performing a relational inner join on the two input records. For example, for every pair of records R0 and R1 coming, respectively, from the in0 port and the in1 port, where the values of the key fields R0.key0 and R1.key1 are equal, the Join component will call the transformation function on R0 and R1, and provide the result to the out port.

For example, a Join component may be configured as follows.

```
Operator Type:    Join
in0.format:       record
                    int a1;
                    int a2;
                    int a3;
                  end;
in1.format:       record
                    int b1;
                    int b2;
                    int b3;
                  end;
out.format:       record
                    int a1;
                    int a2;
                    int b1;
                    int b2;
                    int c1;
                  end;
key0:             a3
key1:             b3
transformation:   out :: join(in0, in1) =
                  begin
                    out.a1 :: in0.a1;
                    out.a2 :: in0.a2;
                    out.b1 :: in1.b1;
                    out.b2 :: in1.b2;
                    out.c1 :: in0.a3 * in1.a3;
                  end;
```

This Join component would find every pair of records R0 and R1 from in0 and in1, respectively, for which R0.a3=R1.b3, pass that pair of records into the transformation function, and provide the result of the transformation function to the out port.

A Rollup component has a single input port labeled (by default) "in" and a single output port labeled (by default) "out." A Rollup component has a parameter, key, that specifies a key field to be used by the rollup operator for aggregating records, and a transformation function to be used by the rollup operator for computing an aggregate result for the aggregated records. The rollup operator is applied by the Rollup component by dividing the input records into subsets such that each subset has the same value for the key field, applying the transformation function to each subset, and providing the result to the out port. The Rollup component will therefore produce one output record for each distinct value appearing in the key field.

The transformation function for a Rollup component is similar to that for a Reformat component, except that it may contain aggregation functions, such as sum, min, and max, that are used in expressions to compute cumulative sums, minima, etc. on the values from the input records in an aggregated set. For example, if an input record has a field in.a1, then an expression of sum(in.a1) in the transformation function would cause the Rollup component to compute the sum of the values appearing in in.a1 across all records having the same value for the key field. If an expression in an entry in a transformation function is not an aggregation function, then the expression in that entry will be evaluated on an arbitrary input record within each aggregated set of records having the same value for the key field.

For example, a Rollup component may be configured as follows.

```
Operator Type:    Rollup
in.format:        record
                    int a1;
                    int a2;
                    int a3;
                  end;
out.format:       record
                    int a1;
                    int a3;
                    int b1;
                  end;
key:              a3
transformation:   out :: rollup(in) =
                  begin
                    out.a1 :: min(in.a1);
                    out.a3 :: in.a3;
                    out.b1 :: sum(in.a2);
                  end;
```

This would configure the Rollup component to divide the data from the in port into aggregated sets having the same value for the key field a3. Within each set, the Rollup component would take the minimum value of a1, a value for a3 from any arbitrary record (the choice of which value to use is, in this case, immaterial because a3 is the value of the key field, hence it has the same value for each record within the set), and the sum of the a2 values. One output record will be produced for each distinct key field value.

Figure 2A:
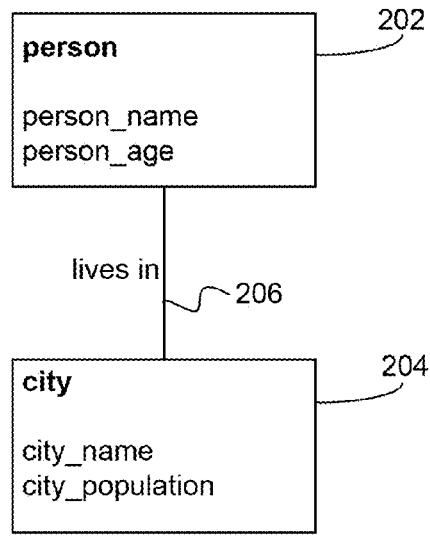
FIGS. 2A and 2B are example schema represented as entity-relationship diagrams.
Figure 2B:
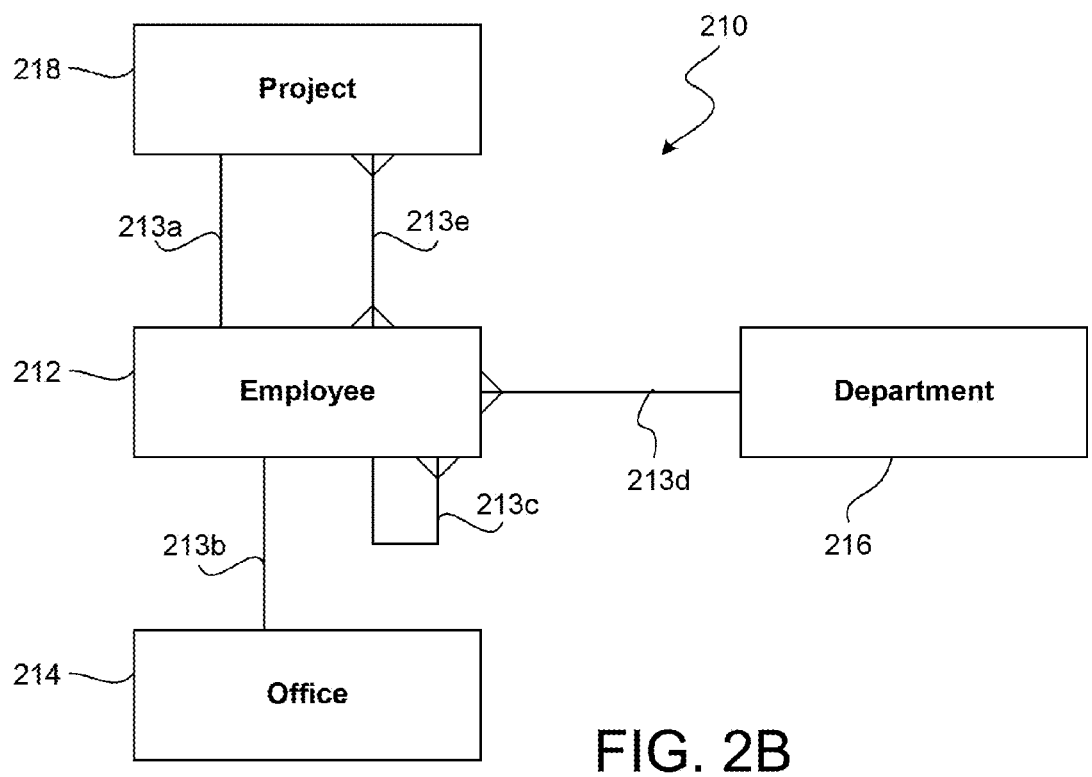

The GDE 102, the APIs, or a combination of the two may be used to generate data structures corresponding to any of the dataflow graph elements, including a component along with its ports, operator type, and parameters, the data formats associated with the ports and values for the parameters, and flows connecting an output port to an input port. Repeated calls to the API functions may be used to generate a dataflow graph programmatically, without necessarily requiring user interaction with the GDE 102. The data objects and metadata corresponding to entities and relationships between the entities stored in the repository 104 can be represented through entity-relationship (ER) diagrams. FIG. 2 shows an example ER diagram 200. The ER diagram 200 illustrates interrelationships between entities. The entities in an ER diagram can represent items in a domain, such as, health care, trading, or accounting, that are capable of having independent and unique identities. The entities can include real world aspects from the domain. For example, entity 202 represents a person, and includes "attributes" relevant to the person, such as, the person's name (with an attribute called "person_name") and the person's age (with an attribute called "person_age"). Similarly, entity 204 represents a city, and includes attributes, such as, the city's name (with an attribute called "city_name") and the city's population (with an attribute called "city_population"). In some examples, an entity can represent a physical object such as a building or a car. In some examples, an entity can represent an event such as a sale in a mortgage transaction or expiry of a provision in a service agreement. In real-world examples, each of the entities 202, 204 would likely have several attributes.

In some implementations, references to "entities" can be associated with entity-type "categories." A data object stored in the repository 104 can be regarded as an instance of an entity associated with a given entity-type category. For example, an entity-type category can be the "person" entity-type category and a specific instance, e.g., data object, associated with the person entity-type category can be a person named "Wade," aged 32. Accordingly, each entity 202, 204 in schema 200 can represent a class of data objects, each object having details regarding specific instances of the entity 202, 204. In schema 200, the entities 202, 204 are related through a "lives in" relationship 206, i.e., objects of the entity-type "person" have a "lives in" relationship to an object of the entity-type "city."

Relationships are described in further detail as follows. Referring to FIG. 2A, in schema 210, entities 212, 214, 216, 218 are related to each other through relationships 213a-e. In some examples, one way for establishing a relationship between two entities, e.g., entities 212 and 218, is through a "primary-key/foreign-key" relationship 213a. A "primary-key" for an entity 212 is an attribute whose value uniquely identifies each instance of an entity 212 of a given entity-type category. For example, "Employee ID" would be a primary key attribute for the "Employee" entity 212. The first entity 212 can have the primary-key/foreign-key relationship 213a to a second entity 218 when the second entity 218 has an attribute that references a primary-key attribute of the first entity 212. This attribute of the second entity 218 is called a "foreign-key." For example, instances of projects in the "Project" entity 218 can each be associated with an "Employee ID" that can serve as the foreign-key attribute.

The schema 210 can depict other kinds of relationships 213b-e between the entities 212, 214, 216, 218. In one implementation, the relationships 213a-d can be represented as lines connecting the entities. For example, the relationships between entities 212 and 214, entities 212 and 218, entities 212 and 216, and entity 212 to itself, can be represented as shown in schema 210, and may include the following basic types of "connectivity" relationships between entities 302, 304, 306, 308: one-to-one, one-to-many, and many-to-many.

In an implementation, a one-to-one connectivity relationship 213b exists when at most one data object in, e.g., "Employee" entity 212, is related to one data object in, e.g., "Office" entity 214. The "Employee" entity 212 represents employees in a company, i.e., each data object in the entity 212 represents an employee. An "Office" entity 214 represents occupied offices in a building, i.e., each data object in the entity 214 represents an office. If each employee is assigned their own office, the corresponding data objects would have a one-to-one foreign-key relationship. A one-to-one connectivity is depicted in schema 210 as a line.

In an implementation, a one-to-many connectivity relationship 213d exists when, for one data object in, e.g., "Employee" entity 212, there are zero, one, or many related data objects in, e.g., "Department" entity 216, and for one data object, i.e., "Department" entity 216, there is one related data object in, e.g., "Employee" entity 212. As described above, the "Employee" entity 212 represents employees in a company. The "Department" entity 216 represents departments in the company, i.e., each data object in the entity 216 represents a department. Each employee is related to one department, and each department is related to many employees. Therefore, the "Employee" entity 212 and the "Department" entity 216 have a one-to-many foreign-key relationship. A one-to-many connectivity is depicted in schema 210 as a line ending with a crow's foot.

In an implementation, a many-to-many connectivity relationship 213e exists when, for one data object in, e.g., "Employee" entity 212, there are zero, one, or many related data objects in, e.g., "Project" entity 218, and for one data object in, e.g., "Project" entity 218, there are zero, one, or many related data objects in, e.g., "Employee" entity 212. For purposes of this example, assume that employees can be assigned to any number of projects at the same time, and a project (i.e., a data object in the "Project" entity 218) can have any number of employees assigned to the project. Accordingly, the "Employee" entity 212 and the "Project" entity 218 would have a many-to-many foreign-key relationship. A many-to-many connectivity is depicted in schema 210 as a line beginning and ending with a crow's foot.

In some examples, there can be a relationship 213c between data objects in the same entity 212. For example, data objects in the "Employee" entity 212 can have a one-to-many relationship with other data objects in the "Employee" entity 212. One employee can have a "supervised by" relationship with another employee represented by a one-to-many foreign-key relationship.

In some examples, entities 212, 214, 216, 218 can be represented in the form of tables. The data object instances of the entities 212, 214, 216, 218 can be represented as records in the tables. In some implementations, one or more tables can be combined or "joined" in a predetermined manner. For example, an inner join of two entity tables requires that each record in the two entity tables to have a matching record. The inner join combines the records from the two tables based on a given join-predicate (e.g., a join key). The join-predicate specifies a condition for the join. For example, a join key specifies that a value for a first attribute of a record from a first entity table be equal to a value of a second attribute of a record from a second entity table. An outer join does not require each record in two joined entity tables to have matching records. Accordingly, the joined table retains each record even if no matching records exist in the two entity tables.

The attributes of entities 212, 214, 216, 218 can be characterized in terms of granularity of the data. For example, an entity representing a person's account can, at a coarser level of granularity, include a single attribute to represent information relating to the person's address. The granularity of data can refer to a fineness with which data fields are sub-divided. As such, in some examples, the entity can represent the same address information at a finer level of granularity by using multiple attributes such as a door number, a street name, a city or town name, and a state name.

For example, a coarser grained attribute in an entity can be household information that represents many customers within the household. A finer grained attribute can be line items in a purchase order. As a coarser grained attribute, a product identifier (or other product level information) can have multiple associated line items.

In some situations, it can be desirable to derive more detailed information from the coarser grained entity. Similarly, it may be desirable to represent information contained in a finer grained entity in a summarized, less detailed manner. In this regard, source entities can be defined having a predetermined level of granularity. The source entities of one or more source schemas can be mapped to destination entities of one or more destination schemas, where preconfigured expressions relate the data of predetermined of granularity to result attributes in the destination entities. For example, source data at a finer level of granularity can be aggregated (e.g., via an expression that includes an aggregation operator) to result in a single attribute in a destination entity.

In some examples, a rule generated by a user based on data from a dataset or a dataflow graph may need to reference auxiliary information contained in external databases or files. For example, such auxiliary information can exist at a coarser or finer level of granularity. As such, this auxiliary information can be processed using the preconfigured expressions to result in desirable forms of attributes for use in applications.

Figure 3:
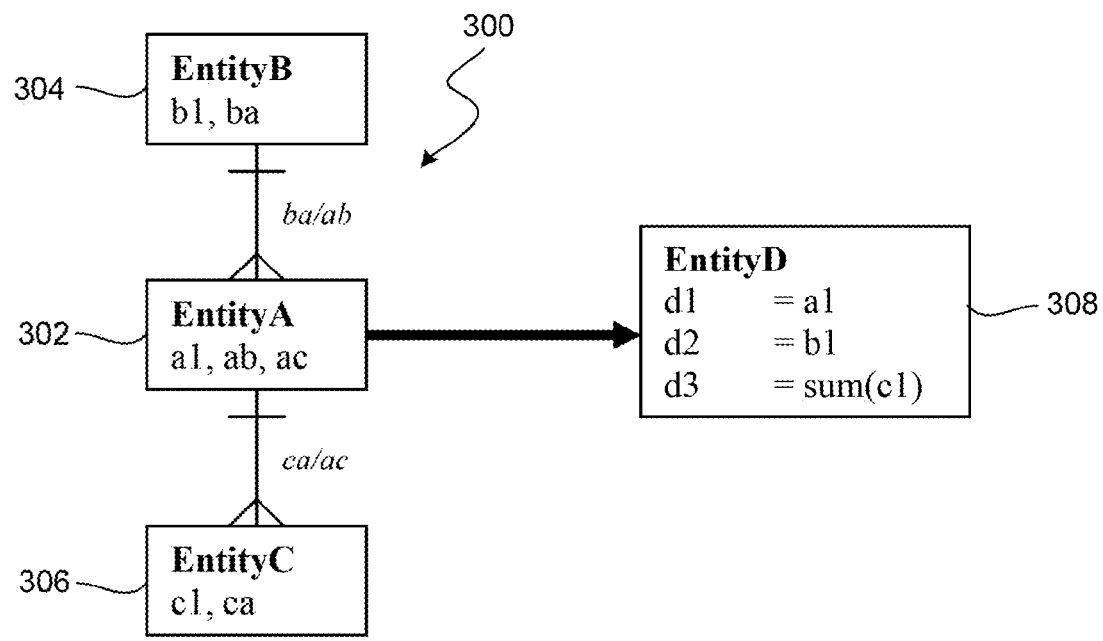
FIG. 3 shows an example mapping from a source schema to a destination entity.

In an example scenario, source entities can be mapped to destination entities using preconfigured expressions as follows. Referring to FIG. 3, a source schema 300 includes three source entities 302, 304, 306, i.e., entity A, entity B, and entity C, each includes attributes a1, ab, and ac, attributes b1, and ba, and attributes c1, and ca, respectively. For purposes of this description, a convention is adopted of having the first letter of an attribute match the owning entity's name. For example, entity A attributes each begin with the letter "a." Further, the second letter of an attribute in an entity is set to "1" to denote that the attribute is a primary key attribute. Relationships between entities are represented as follows: n:1 (many-to-one) from entity A to entity B, and 1:n (one-to-many) from entity A to entity C.

Join keys associated with each relationship are shown on the relationship, e.g., ba/ab for the join of entity A to entity B, and ca/ac for the join of entity A to entity C. In this description, a convention is adopted of having the second letter of an attribute used in a join key match the partnered entity's name.

As shown, entity A (e.g., intermediate/source entity) is caused to be mapped 1:1 (one-to-one) to entity 308, i.e., entity D (e.g., destination entity). The mapping is depicted by an "arrow" directed from entity A to entity D.

The definition of the mapping of entity A to entity D is provided by individual, preconfigured logical expressions involving the attributes of the entities. For example, in defining, in a first part, the mapping of entity A to entity D, attribute d1 is assigned the value of attribute a1. In some examples, the value of attribute a1 can be copied directly in to attribute d1.

In defining, in a second part, the mapping of entity A to entity D, attribute d2 is assigned the value of attribute b1. However, b1 is not in the source entity A, but is found in entity B. Accordingly, entities A and B would need to be joined to reach the attribute b1 in the computation of the value of attribute d2.

In defining, in a third part, the mapping of entity A to entity D, attribute d3 is assigned the value of aggregation expression "summation" over attribute c1. As such, entity C would first need to be rolled up over attribute c1, before entity C is joined with entity A to reach the value of the aggregation expression "summation" over attribute c1 in the computation of the value of attribute d3.

In one implementation, the joins and rollups described above define a path from a source attribute to a destination attribute. Accordingly, the joins and rollups are used to map an attribute in a destination entity based on a path through a root or immediate entity (e.g., entity A in the example above) to an entity where a source attribute (e.g., a1, b1, c1) is stored. In some examples, the path from the root entity to the entities containing source attributes defines a schema structured in the form of a tree.

In some examples, a "simple" mapping from a first entity to a second entity consists of a "tree" type source schema with a unique designated root entity and any number of other entities related to the root entity or to each other, and one or more destination entities that are not part of the source schema, but may form a destination schema. For example, in FIG. 3, the source schema 300 includes entities 302, 304, and 306. The destination entity 308 is not part of the source schema 300.

Figure 4:
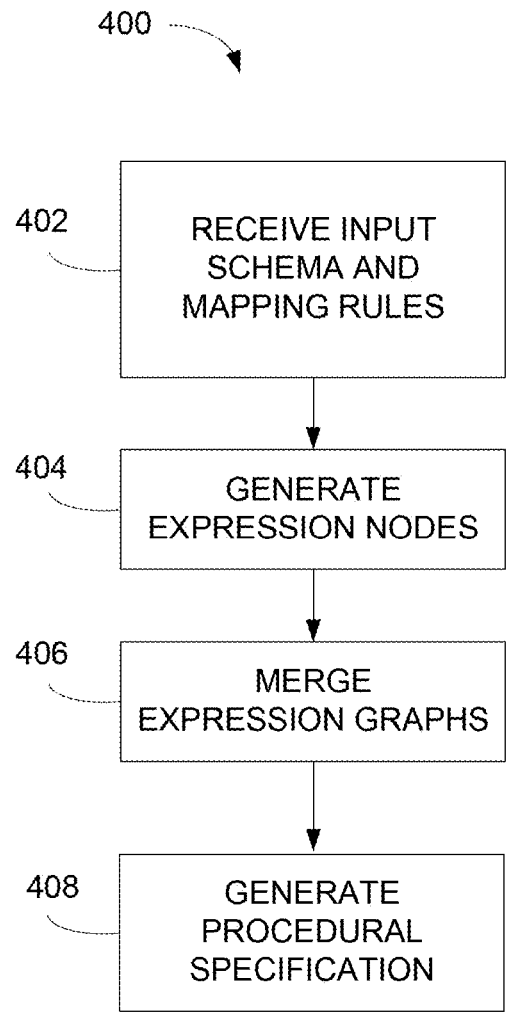
FIG. 4 shows an example process for transforming source schema and mapping information to a graph component.

Referring now to FIG. 4, a process 400 for transforming the source schema and mapping information into a procedural specification for computing the attributes of the mapped destination entities, such as query language expressions, a dataflow graph, or a computer program is shown. For example, the source schema and mapping information can include a mapping from one or more source entities in a source schema to a destination entity in the form of an expression that defines attributes of the destination entity in terms of attributes of the source entities using various operators or functions, possibly including some elements of the expression that will correspond to procedures in the procedural specification. In some examples, initial information includes a source schema that has a directed acyclic graph structure (as shown in FIG. 4, which can also be categorized as having a tree structure since the relationship links of the graphs are undirected and therefore any node can be considered to be a root of the tree) and a set of mapping rules specifying how the attributes of one or more destination entities of a destination schema are to be generated (Step 402). The mapping rules and source schema can be used to generate a set of expression nodes (Step 404). The expression nodes, as described in detail below, are represented in intermediate data structures. Each attribute in a destination entity can be defined by a mapping rule that defines an expression constructed from attributes of the entities in the source schema along with an arbitrary collection of scalar operators (e.g., +, −, function calls, etc.) and aggregation operators (e.g., sum, min, max, etc). Any of a variety of languages can be used for the expressions in the mapping rules. For example, the expressions can be written in data manipulation language (DML) by a user and provided as user input. Various input interfaces can be used to receive the mapping rules, including for example, a business rules interface (e.g., an interface as described in U.S. Pat. No. 8,069,129, incorporated herein by reference). The initial information can also include a metadata that describes a physical representation of data corresponding to the entities (e.g., a dataset file name and record format).

In some implementations, a mapping module (e.g., executing the in the operating environment 106) converts a schema-to-schema mapping from a source schema to a destination schema with attributes related to the source schema through mapping rules into to a collection of expressions (e.g., relational expressions in terms of relational algebra and organized as expression nodes). In some examples, any known method for storing data structures can be used to store the expression nodes in the form of one or more "query plans," where each query plan is a collection of expression nodes related by directed links that can be used to produce a value specified by a query, and having a directed acyclic graph structure. The directed links in the query plan represent dependency relationships (e.g., an identifier of one expression node referenced by another expression node), as described in more detail below. The relational expressions represented by the expression nodes of a query plan can be defined in terms of abstract relational operators such as "join" or "rollup," which can have a variety of concrete implementations in terms of specific algorithms. A separate query plan is generated for each output attribute of a destination entity in the destination schema. An output attribute that is defined by a mapping expression that does not require data from more than one entity in the source schema may correspond to a query plan with just a single expression node. An output attribute that is defined by a mapping expression that requires data from multiple entities in the source schema may correspond to a query plan that has the topology of a tree with the value of the output attribute represented by its root expression node. From the query plan, a mapping module is able to generate a dataflow graph or other form of procedural specification that specifies some or all of the procedures that will be used for computing values of the attributes of the destination schema.

In some examples, the query plans can be merged to combine one or more expressions, thus resulting in a new query plan with a new node structure (Step 406). The merging of query plans can result in a more complex organization of the intermediate data structures. For example, the merged set of expression nodes may no longer be in a form of a tree (e.g., there may be more than a single root or the links from a single node may merge again at another node, but the graph may still be acyclic). The resulting merged set of expression nodes can be processed as described below to generate a corresponding procedural specification (Step 408). In this manner, the original source schema and mapped destination schema can be transformed to a dataflow graph, as described in more detail below. In some implementations, additional techniques can be used for generating dataflow graphs from query plans (e.g., as described in U.S. Publication No. 2011/0179014, incorporated herein by reference).

Figure 5:
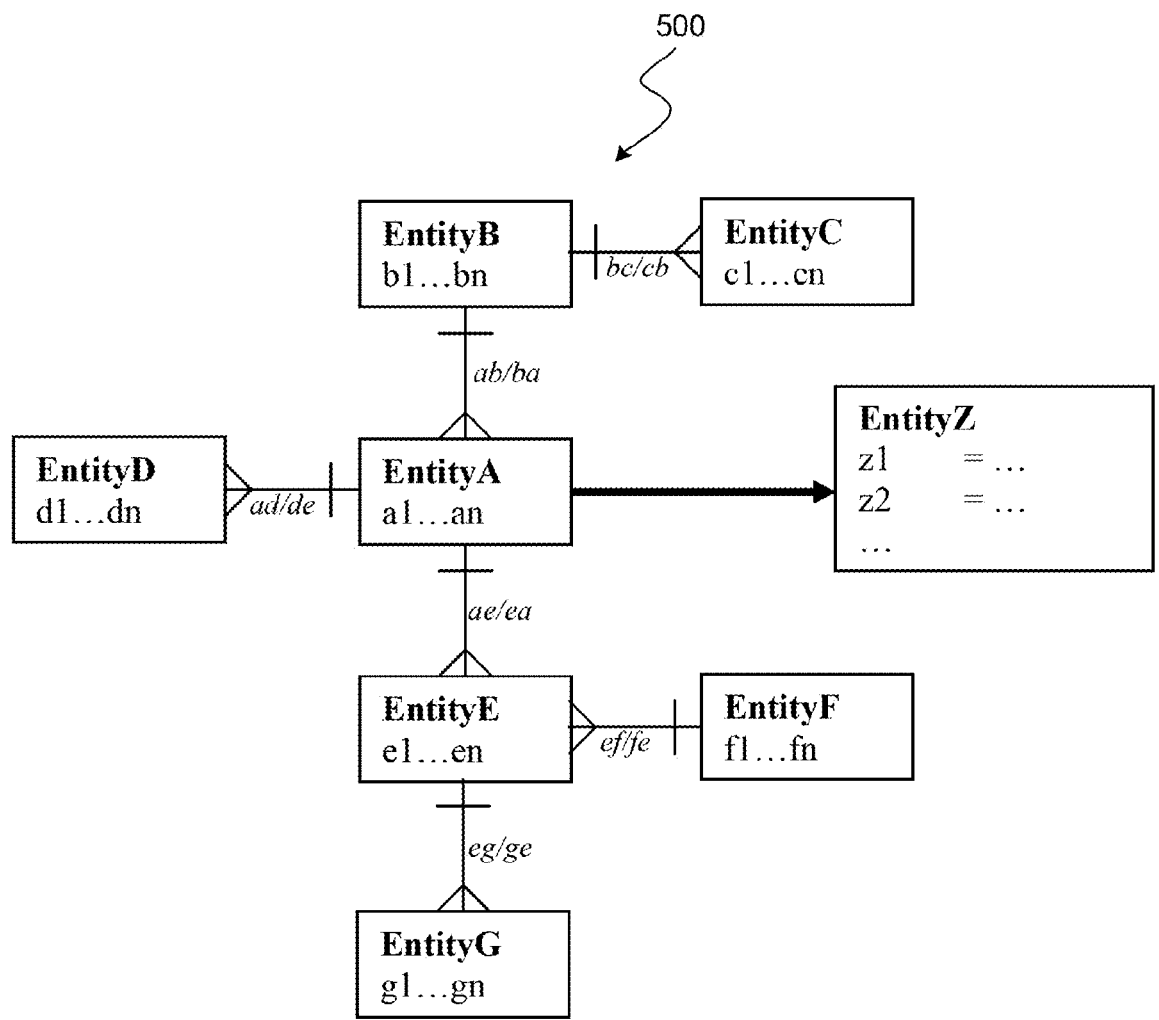
FIG. 5 shows a more complex example of mapping from a source schema to a destination entity.

Referring now to FIG. 5, a source schema 500 is represented as an ER diagram that includes entities EntityA, EntityB, EntityC, EntityD, EntityF, and EntityG. In this example, the destination schema includes a single entity EntityZ as a destination entity. As described above, in one implementation, the graph formed by entities and relationships in the source schema is a tree with a single root entity EntityA. Each relationship between two entities is associated with a join key for each entity, for example, the join key "ab" is used on the side of EntityA and the join key "ba" is used on the side of EntityB.

Expressions in mapping rules that define the attributes in the destination entity EntityZ can be converted to a parse tree, with leaves of the parse tree being attributes and interior nodes of the parse tree being expression and aggregation operators. In some examples, an expression can be a "primitive" expression having a parse tree that does not include any aggregation operators.

In some examples, expressions in mapping rules are expressed using relational algebra. The relational algebra can include a relation, e.g., a table, and a transform. In some examples, the relation can be a table having columns and rows (e.g., an entity, a join, or a rollup, each represented in the form of a table). The transform can specify columns in an output relation.

Using the convention described above, in one implementation, a notation for a transform is given by:

```
<transform>   ::= <element>[, <element>]*
<element>     ::= <identifier> || <identifier>=<expression
```

The following example transform expressions are translated into English as shown corresponding to the transform expression:

| | |
|---|---|
| a1 | Pass through a1 to the output |
| a1, b1 | Pass through a1 and b1 to the output |
| t1 = a1 + b1 | Create a temporary variable t1 = a1 + b1. |
| t1 = a1 + b1, b2 | Create a temporary variable t1 = a1 + b1, and pass through | b2

In an implementation, syntax for a 2-way join is given as follows:

$$\text{join}(<rel1>/<k12>,<rel2>/k21>)$$

where rel1 and rel2 are the two relations and k12 and k21 are join keys. For multi-way joins, a first relation is a "central" relation. The second and subsequent relations join with the central relation. The syntax is given as follows:

$$\text{join}(<rel1>/<k12>/<k22>\ldots,<rel2>/<k21>,<rel3>/<k31>\ldots)$$

As an illustration, a 3-way join of entities A, B, and D would be depicted as follows:

$$\text{join}(A/ab/ad,B/ba,D/da)$$

In some implementations, the foregoing expression is equivalent to either of the following cascades of 2-way joins:

$$\text{join}(A/ab,\text{join}(A/ad,D/da)/ba)$$

$$\text{join}(A/ad,\text{join}(A/ab,B/ba)/da)$$

Syntactical notation for a rollup is given as follows:

$$\text{rollup}(<rel>/<key>)$$

As an illustration, a rollup of D on the attribute da would be depicted as follows:

$$\text{rollup}(d/da)$$

In some examples, expressions in mapping rules are expressed using expression nodes. In one implementation, an expression node includes (1) an identifier, which allows the expression node to be referred to by other expression nodes; (2) an expression, which identifies an expression corresponding to the node; (3) a context entity, which identifies a context in which an expression is evaluated and joins/rollups in which a resulting value from evaluating the expression may participate; (4) a transform, which specifies columns in an output relation; (5) a relational expression (also called the node's relation attribute), having relations and transforms, as described above; and (6) a set of child nodes corresponding to the input relations for the node.

Figure 6:
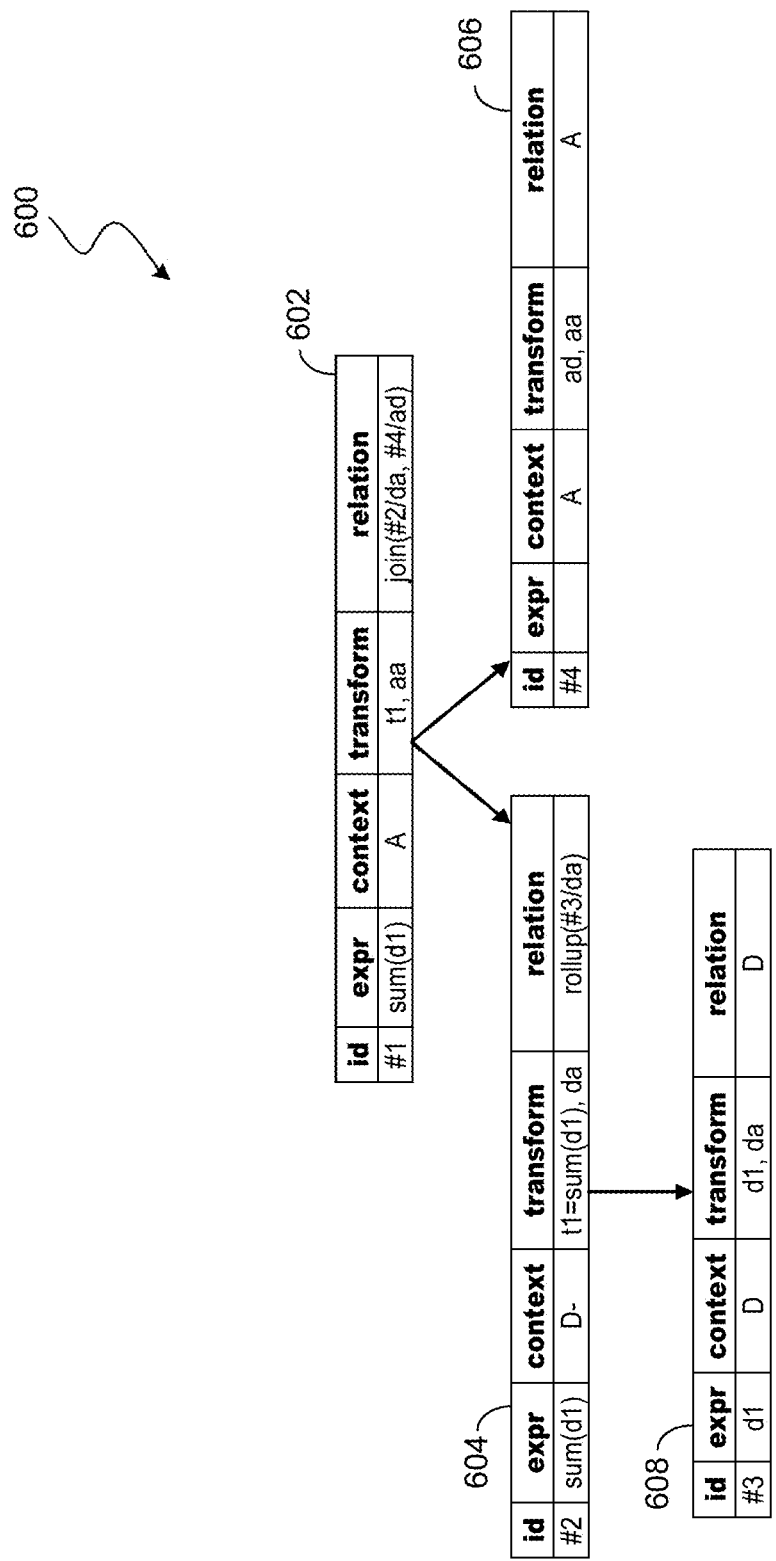
FIG. 6 shows example expression nodes.

An example of a query plan including expression nodes that correspond to an expression in a mapping rule will now be presented. Referring to FIG. 6, a query plan 600 includes a set of example expression nodes 602, 604, 606, 608 corresponding to an expression "sum(d1)" from a defined mapping rule. The expression "sum(d1)" specified in node #1, i.e., node 602, can be evaluated by performing a rollup (specified in node #2, i.e., node 604) of relation D (specified in node #3, i.e., node 608) on the key "da." As specified in node #1, the results of the rollup specified in node #2 is joined with relation A (specified in node #4, i.e., node 606) with join keys da and ad.

The expression nodes of the query plan 600 of FIG. 6 can be expressed in tabular form as shown in Table 1 below. The indentations of the expressions in the "Expression" column represent the parent/child relationship between the nodes. The "−" sign in the "Context Entity" field of node #2 is discussed in detail below.

TABLE 1

| Identifier (ID) | Expression | Context Entity | Transform | Relational Expression |
|---|---|---|---|---|
| #1 | sum(d1) | A | t1, aa | join(#2/da, #4/ad) |
| #2 | sum(d1) | D- | t1 = sum(d1), da | rollup(#3/da) |

TABLE 1-continued

| Identifier (ID) | Expression | Context Entity | Transform | Relational Expression |
|---|---|---|---|---|
| #3 | d1 | D | da, da | D |
| #4 | empty | A | ad, aa | A |

In an example, an expression sum(c1)*a1*b1 can be evaluated by constructing expression nodes as follows. An aggregate expression can be compiled to a tree of expression nodes (see, for example, FIG. 6, corresponding to expression "sum (d1)"). When an expression node for an aggregate expression is created, an evaluation context for the node is not known until later in processing. For example, other than the "Expression" column, the columns in the Table 1 cannot yet be populated. Table 2, shown below, represents an initial expression node:

TABLE 2

| Identifier (ID) | Expression | Context Entity | Transform | Relational Expression |
|---|---|---|---|---|
| #1 | sum(c1) * a1 * b1 | | | |

A detached expression node for each aggregation operator in the expression is created as shown below in Table 3 for the expression "sum(c1)":

TABLE 3

| Identifier (ID) | Expression | Context Entity | Transform | Relational Expression |
|---|---|---|---|---|
| #1 | sum(c1) | | | |

The aggregate expression is assigned a child node including attributes in the expression being aggregated as shown in Table 4. In an implementation, if an aggregation expression is for example, "sum(c1, c2 !=0)," then the child node can include (c1, c2).

TABLE 4

| Identifier (ID) | Expression | Context Entity | Transform | Relational Expression |
|---|---|---|---|---|
| #2 | sum(c1) | | | |
| #3 | c1 | | | |

The context entities for the expressions are evaluated as follows. Referring to Table 4, the child node #3 includes only the expression c1 and no aggregation operations. Accordingly, expression c1 is a primitive expression. An algorithm for compiling a primitive expression to a tree of expression nodes can be run on the expression c1. In an implementation, the algorithm begins with a determination of an "aggregation set" for each entity in the expression c1. In general, an aggregation set measures rollups required to aggregate a given attribute to the root entity of the schema. In order to determine the aggregation set, the mapping module determines, for each entity e, the relationship r that connects e to the root of the schema. The other side of that relationship is denoted e'. The aggregation set A(e) is defined as {e}∪A(e') if r is many-to-one, or A(e') otherwise. The aggregation set of the root entity is { }.

Referring to FIG. 5, example aggregation sets for entities in the source schema 500 are as follows:

| Entity A | { } | Entity A is a root entity |
|---|---|---|
| Entity B | { } | The relationship from B to A is one-to-many. |
| Entity C | {C} | The relationship from C to B is many-to-one. |
| Entity D | {D} | The relationship from D to A is many-to-one. |
| Entity E | {E} | The relationship from E to A is many-to-one. |
| Entity F | {E} | The relationship from F to E is one-to-many. |
| Entity G | {E, G} | The relationship from G to E is many-to-one. |

Given an expression, a maximum aggregation set (MAS) is the largest aggregation set of any entity mentioned in the expression. In some examples, the MAS can be unique. For example, consider the expression b1+e1+g1. This expression references entities B, E, and G. The corresponding aggregation sets are { }, {E}, and {E,G} respectively. The MAS for the expression is therefore {E,G}.

In some examples, a MAS that is not unique is not allowed. For example, the expression c1*e1 mentions entities C and E, with aggregation sets {C} and {E}, respectively. In this case, there is no unique MAS for the expression c1*e1. The expression e1*f1 mentions E and F, with aggregation sets {E} and {E}, respectively. The MAS of {E} is unique in this case, even though there are multiple entities having the same aggregation set.

An evaluation context for an expression is an entity with a MAS, and which is closest to the root entity of the schema. In general, the evaluation context for a top-level expression is the root entity. For example, consider the expression a1+b1. The MAS is { }. Both entities A and B have { } as the aggregation set. However, A is closest to the root, and consequently is used as the evaluation context. In another example, consider the expression e1+g1. The MAS is {E, G}. Consequently, the evaluation context is G.

After an evaluation context for an expression node is chosen, the expression node is filled with the information regarding chosen evaluation context. Referring again to Table 4, the evaluation context for c1 is C. Accordingly, the updated expression node is as shown in Table 5 below.

TABLE 5

| Identifier (ID) | Expression | Context Entity | Transform | Relational Expression |
|---|---|---|---|---|
| #2 | sum(c1) | | | |
| #3 | c1 | C | | |

In an implementation, an "aggregation relationship" for the expression node is calculated. An aggregation relationship for an aggregate is the attribute connecting the evaluation context to the root entity. In the current example, for expression c1, the evaluation context is C, and the aggregation relationship is cb. In an example, for expression e1*g1, the evaluation context is G and the aggregation relationship is ge. In an example, for expression f1, the evaluation context is E and the aggregation relationship is ea.

To roll up the intermediate result on the aggregation relationship computed above, the key for the aggregation relationship is added to the expression node. As indicated above, the aggregation relation for C1 is cb. Accordingly, the expression node is updated as shown in Table 6 below.

TABLE 6

| Identifier (ID) | Expression | Context Entity | Transform | Relational Expression |
|---|---|---|---|---|
| #2 | sum(c1) | | | |
| #3 | c1, cb | C | | |

The child node, i.e., node #3 can be now compiled. If the child node includes nested aggregates, then as described below, a nested aggregate compilation algorithm can be called recursively. Accordingly, the expression node is updated as shown in Table 7 below.

TABLE 7

| Identifier (ID) | Expression | Context Entity | Transform | Relational Expression |
|---|---|---|---|---|
| #2 | sum(c1) | | | |
| #3 | c1, cb | C | c1, cb | C |

Based on the computations described above in connection with tables 1-8, the expression node can be filled in as shown in Table 8 below.

TABLE 8

| Identifier (ID) | Expression | Context Entity | Transform | Relational Expression |
|---|---|---|---|---|
| #2 | sum(c1) | C− | t1 = sum(c1), cb | rollup (#3/cb) |
| #3 | c1, cb | C | c1, cb | C |

The context entity is the evaluation context of the expression followed by a "−" sign. The "−" sign on node #2 signifies that a level of aggregation has been lost. For example, the aggregation set for C is {C}, while the aggregation set for C− is { }. Without such an adjustment, the MAS for b1+sum(c1) would be {C} and the evaluation context for the expression would be C instead of B.

The relation is a rollup of the child node on the outgoing key, cb, of the rollup relationship. The transform assigns the aggregated value to a temporary variable t1 (temporary variables will be introduced in these examples using the character "t" followed by an number distinguishing different temporary variables) and passes through the rollup key, cb.

The original node, i.e., node #1 in Table 2, is now compiled as follows. The variable t1 is substituted for the aggregate node. Accordingly, the original expression sum(c1)*a1*b1 is treated as if it were t1*a1*b1. These terms are associated with context entities C−, A, and B respectively. The aggregation set for each of these entities is { }, so the MAS is { } and the evaluation context is A. The updated table is shown as Table 9 below.

TABLE 9

| Identifier (ID) | Expression | Context Entity | Transform | Relational Expression |
|---|---|---|---|---|
| #1 | sum(c1) * a1 * b1 | A | | |

The paths to two of the attributes sum(c1) and b1 cross the ba relationship. Consequently, a child node is created for B and a join is inserted as shown in Table 10 below.

TABLE 10

| Identifier (ID) | Expression | Context Entity | Transform | Relational Expression |
|---|---|---|---|---|
| #1 | sum(c1) * a1 * b1 | A | t1 * a1 * b1 | join(#4/ab, #5/ba) |
| #4 | a1 | A | a1, ab | A |
| #5 | (sum(c1), b1) | B | | |

The evaluation context for the expression (sum(c1), b1) referenced by the child node is B, with attributes coming from B and C. Therefore a node is created for b1. Accordingly, the expression nodes are updated as shown in Table 11 below.

TABLE 11

| Identifier (ID) | Expression | Context Entity | Transform | Relational Expression |
|---|---|---|---|---|
| #1 | sum(c1) * a1 * b1 | A | t1 * a1 * b1 | join(#4/ab, #5/ba) |
| #4 | a1 | A | a1, ab | A |
| #5 | (sum(c1), b1) | B | t1, b1, ba | join(#6/bc, #2/cb) |
| #6 | b1 | B | b1 | B |
| #2 | sum(c1) | C− | t1 = sum(c1) | rollup(#3/cb) |
| #3 | c1 | C | c1 | cb |

As mentioned briefly above, aggregates can be nested, either explicitly or implicitly. In general, the degree of nesting matches cardinality of the aggregation set for values being aggregated. For example, g1 has an aggregation set {E, G}. Accordingly, aggregates involving g1 have two levels of aggregation, e.g. max(sum(g1)).

In some examples, a nested aggregate compilation algorithm can convert un-nested aggregates to nested aggregates at compile time. For example, sum(g1) becomes sum(sum (g1)), and count(g1) becomes sum(count(g1)). In such a scheme, in an implementation, it can be made illegal to directly enter a nested aggregate.

In some examples, nested aggregates can be mandated. In such a scheme, aggregates such as max(sum(g1)) and sum (sum(g1)*e1)) can be specified.

In some examples, a nested aggregate compilation algorithm can either convert un-nested aggregates to nested aggregates at compile time while simply passing through nested aggregates. For example, sum(g1) is converted to sum(sum (g1)) at compile-time, while max(sum(g1)) is passed through the nested aggregate compilation algorithm unchanged.

Consider an example nested aggregate expression max (sum(g1)). Using the expression node techniques outlined above, the following Tables 12-15 can be constructed.

TABLE 12

| Identifier (ID) | Expression | Context Entity | Transform | Relational Expression |
|---|---|---|---|---|
| #1 | max(sum(g1)) | A | t1 | join(#2/ae, #3/ea) |

As before, detached nodes are created:

TABLE 13

| Identifier (ID) | Expression | Context Entity | Transform | Relational Expression |
|---|---|---|---|---|
| #3 | max(sum(g1)) | | | |
| #4 | sum(g1) | | | |

A second level of detached nodes are created:

TABLE 14

| Identifier (ID) | Expression | Context Entity | Transform | Relational Expression |
|---|---|---|---|---|
| #6 | sum(g1) | | | |
| #7 | g1 | | | |

Nodes #7 and #6 can be compiled directly:

TABLE 15

| Identifier (ID) | Expression | Context Entity | Transform | Relational Expression |
|---|---|---|---|---|
| #6 | sum(g1) | G– | t2 = sum(g1), ge | rollup(#7/ge) |
| #7 | g1 | G | g1, ge | G |

Based on Tables 12-15, node #3 can be compiled:

TABLE 16

| Identifier (ID) | Expression | Context Entity | Transform | Relational Expression |
|---|---|---|---|---|
| #3 | max(sum(g1)) | E– | t1 = max(t2), ea | rollup(#4/ea) |
| #4 | sum(g1) | E | t2, ea | join(#5/eg, #6/ge) |
| #5 | empty | E | ea, eg | E |
| #6 | sum(g1) | G– | t2 = sum(g1), ge | rollup(#7/ge) |
| #7 | g1 | G | g1, ge | G |

Finally, based on Table 15, the node #1 can be compiled:

TABLE 17

| Identifier (ID) | Expression | Context Entity | Transform | Relational Expression |
|---|---|---|---|---|
| #1 | max(sum(g1)) | A | t1 | join(#2/ae, #3/ea) |
| #2 | empty | A | ae | A |
| #3 | max(sum(g1)) | E– | t1 = max(t2), ea | rollup(#4/ea) |
| #4 | sum(g1) | E | t2, ea | join(#5/eg, #6/ge) |
| #5 | empty | E | ea, eg | E |
| #6 | sum(g1) | G– | t2 = sum(g1), ge | rollup(#7/ge) |
| #7 | g1 | G | g1, ge | G |

Figure 7:
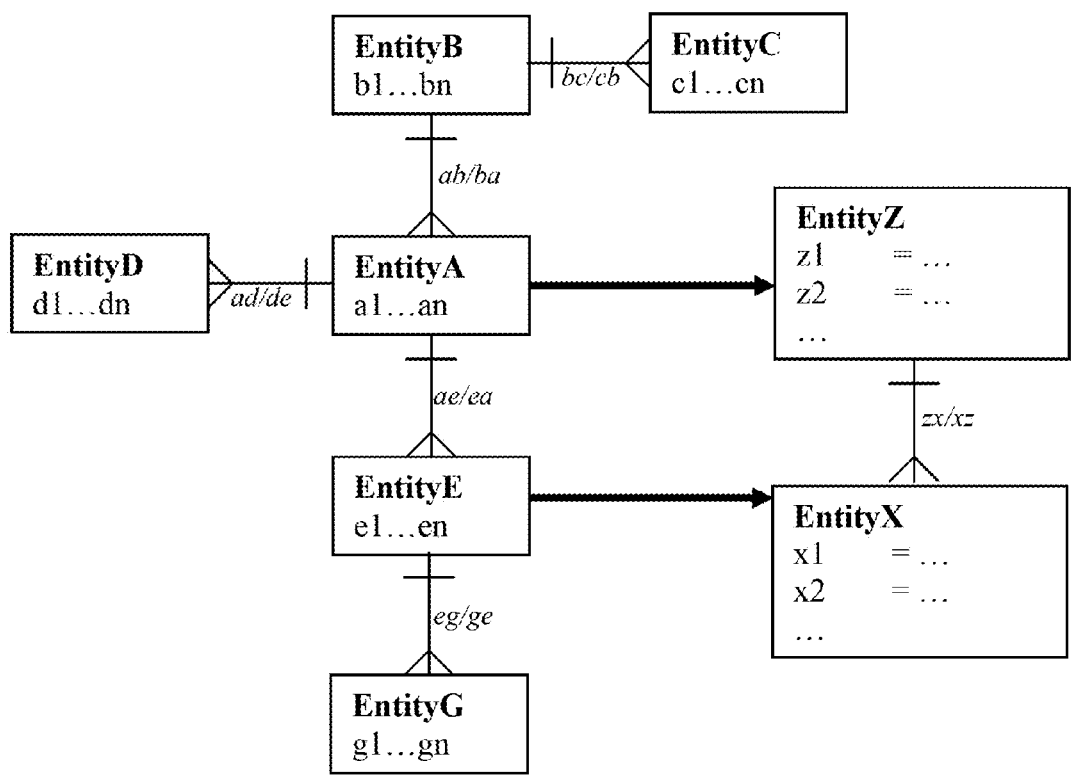
FIGS. 7 and 8 show example mapping from a source schema to or more destination entities.

In some examples, more than one entity can be mapped at the same time. Referring to FIG. 7, a destination schema including two destination entities X and Z are presented. Expressions in the mapping rule for entity X can be interpreted with entity E as the root entity. Expressions in the mapping rule for entity Z can be interpreted with entity A as the root entity. In some examples, the mapping rules include mappings for the attributes, i.e., ae maps to zx, and ea maps to xz.

Figure 8:
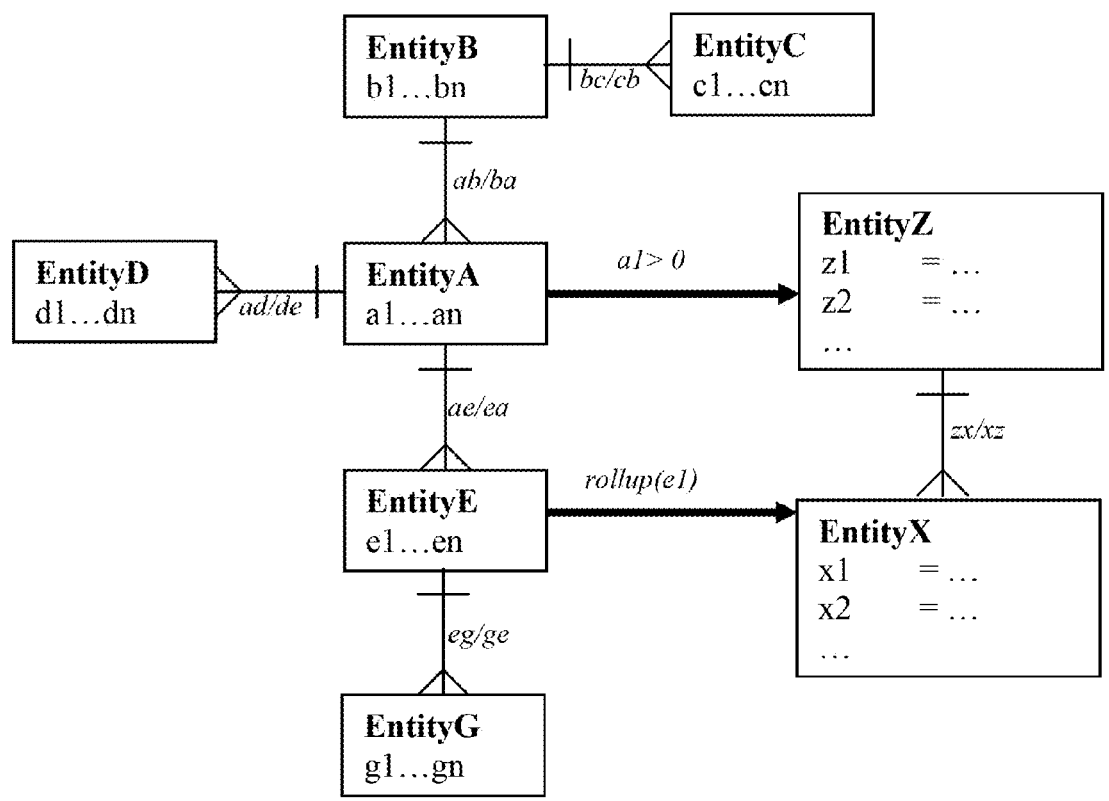

In some examples, mapping rules include relational operations such as selections and rollups. Referring to FIG. 8, mapping rules including a selection, e.g., a1>0, and a rollup, e.g., rollup(e1), are shown with respect to the same source schema and destination schema as in FIG. 7. In compiling mapping rules with rollups, a many-to-one relationship going out of entity E to a pseudo-entity E', which would be treated as the root can be assumed.

Figure 9A:
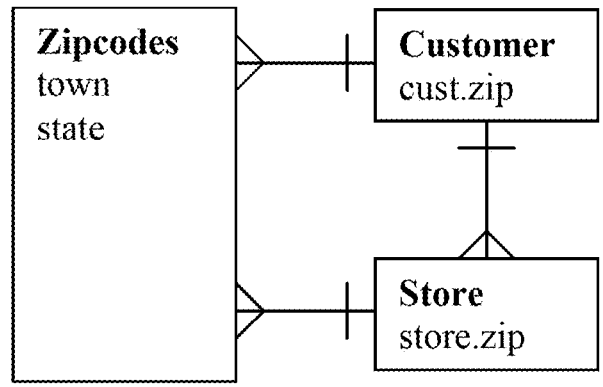
FIGS. 9A and 9B show example schemas.
Figure 9B:
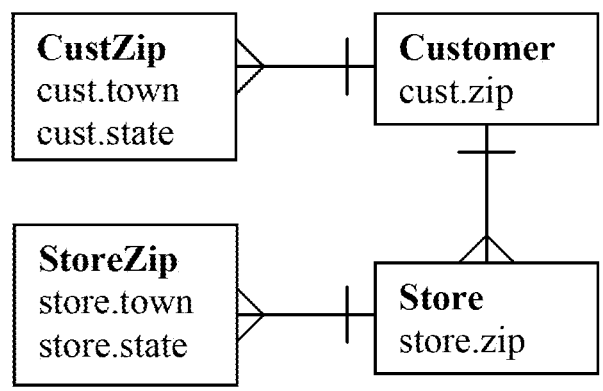

In some examples, a source schema may not be in the form of a tree. For example, the source schema may be cyclic. Referring to FIG. 9A, a cyclic schema is shown. Here, both the "Customer" and "Store" entities use output from the same entity "Zipcodes". The cyclic schema can be broken by an aliasing algorithm. For example, as shown in FIG. 9B, an aliasing algorithm can cause two aliased copies of the relationship between Zipcodes and "Customer" and "Store" respectively to be generated. In this manner, the cycle can be removed. The schema of FIG. 9B now allows an end-user to specify attributes in the "Zipcodes" entity more precisely (e.g., a customer's state or a store's state).

Once expressions are converted to query plans, the trees can be converted to dataflow graphs. In one implementation, the procedure for producing a dataflow graph includes 1) merging expressions to avoid redundant joins, redundant aggregations, or redundant scanning of data corresponding to the same entity; 2) optionally, optimizing a set of relational operators; and 3) transcribing results from the merging or the optimizing into a dataflow graph.

After all the expressions in the system have been compiled to query plans, accumulated expressions are merged by performing elimination of common subexpressions on the relational expression fields of all the expression nodes. An example of such merging is shown as follows. In Table 18 two nodes are presented:

TABLE 18

| Identifier (ID) | Expression | Context Entity | Transform | Relational Expression |
|---|---|---|---|---|
| #1 | a1 | A | a1 | A |
| #2 | a2 | A | a2 | A |

The two nodes of Table 18 can be merged in to a single node #3 as shown in Table 19 below:

TABLE 19

| Identifier (ID) | Expression | Context Entity | Transform | Relational Expression |
|---|---|---|---|---|
| #3 | * | A | a1, a2 | A |

The new expression node has the same relational expression, and its transform field is a combined list of the transforms of the merged nodes. The merged query plans can be converted to one or more dataflow graphs by the mapping module running in the parallel operating environment 106. For example, appropriate graph components can be inserted, transformations added to the components based on the expression nodes, and DML code can be generated for the intermediate results. Particular types of graph components are used for performing operations of particular types of expression nodes. An expression node that scans data for a particular entity can be implemented with a component that scans records of a dataset (e.g., a file or a table in a database) corresponding to the entity. The component may access the records by reading a file storing the records or by querying a table in a database, for example. An attribute of an entity specified by the expression node may correspond to a field of the records in the table. An aggregation in an expression node can be implemented using a component that performs a rollup operation. A join in an expression node can be implemented using a component that performs the join operation.

The following is an example of the generation of query plans for different mapping rules, merging of the query plans, and generation of a dataflow graph from the merged query plans. In this example, two mapping rules are received, each including a single expression for a single output attribute (x0 and x1, respectively) that reference attributes of entities in a source schema (a1, b1, and e1).

$$x0 = a1 * b1$$

$$x1 = \text{sum}(b1 * e1)$$

Each of these expressions corresponds to an expression tree of expression nodes. The expression tree for the input expression for the attribute value x0 is as follows.

| id | expr | context | transform | relation |
|---|---|---|---|---|
| #1 | a1 * b1 | A | t1 = a1 * b1 | join(#2/ab, #3/ba) |
| #2 | a1 | A | a1, ab | A |
| #3 | b1 | B | b1, ba | B |

The expression tree for the input expression for the attribute value x1 is as follows.

| id | expr | context | transform | relation |
|---|---|---|---|---|
| #4 | sum(b1 * e1) | A | t2 | join(#5/ae, #6/ea) |
| #5 | empty | A | ae | A |
| #6 | sum(b1 * e1) | E– | t2 = sum(t3), ea | rollup(#7/ea) |
| #7 | b1*e1 | E | t3 = e1 * b1 , ea | join(#8/ea, #9/ae) |
| #8 | e1 | E | e1, ea | E |
| #9 | b1 | A | b1, ae | join(#10/ab, #11/ba) |
| #10 | empty | A | ab, ae | A |
| #11 | b1 | B | b1, ba | B |

The expression nodes from both trees are combined as shown below, with an additional expression node (labeled "END") added to represent the combined results of the mapping rules. The additional expression node corresponds to joining together the two top-level expressions (#1 and #4) on the primary key for A (e.g., aa).

| id | expr | context | transform | relation |
|---|---|---|---|---|
| #1 | a1 * b1 | A | t1 = a1 * b1, aa | join(#2/ab, #3/ba) |
| #2 | a1 | A | a1, ab, aa | A |
| #3 | b1 | B | b1, ba | B |
| #4 | sum(b1 * e1) | A | t2, aa | join(#5/ae, #6/ea) |
| #5 | empty | A | ae, aa | A |
| #6 | sum(b1 * e1) | E– | t2 = sum(t3), ea | rollup(#7/ea) |
| #7 | b1 * e1 | E | t3 = e1 * b1, ea | join(#8/ea, #9/ae) |
| #8 | e1 | E | e1, ea | E |
| #9 | b1 | A | b1, ae | join(#10/ab, #11/ba) |
| #10 | empty | A | ab, ae | A |
| #11 | b1 | B | b1, ba | B |
| END | | A | t1, t2 | join(#1/aa, #4/aa) |

There are three instances a relational expression identifying entity A, so the mapping module merges them and updates the references to the node identifiers. Expression nodes #2, #5, and #10 are removed and replaced with a single new merged node with one of the previous identifiers (in this example, identifier #2). The new node has the same context and relational expressions as each of the nodes being merged, and the transform value is s combined list of the transform values of the nodes being merged.

| id | expr | context | transform | relation |
|---|---|---|---|---|
| #1 | a1 * b1 | A | t1 = a1 * b1, aa | join(#2/ab, #3/ba) |
| #2 | a1 | A | a1, ab, aa, ae | A |
| #3 | b1 | B | b1, ba | B |
| #4 | sum(b1 * e1) | A | t2, aa | join(#2/ae, #6/ea) |
| #5 | empty | A | ae, aa | A |
| #6 | sum(b1 * e1) | E– | t2 = sum(t3), ea | rollup(#7/ea) |
| #7 | b1 * e1 | E | t3 = e1 *b1, ea | join(#8/ea, #9/ae) |
| #8 | e1 | E | e1, ea | E |
| #9 | b1 | A | b1, ae | join(#2/ab, #11/ba) |
| #10 | empty | A | ab, ae | A |
| #11 | b1 | B | b1, ba | B |
| END | | A | t1, t2 | join(#1/aa, #4/aa) |

Expression nodes #3 and #11 are merged since there are two relational expressions listing entity B. In this case, the expression nodes are identical (except for their hierarchy levels in their original trees) so node #11 is removed and node #3 represents the new merged node.

| id | expr | context | transform | relation |
|---|---|---|---|---|
| #1 | a1 * b1 | A | t1 = a1 * b1, aa | join(#2/ab, #3/ba) |
| #2 | a1 | A | a1, ab, aa, ae | A |
| #3 | b1 | B | b1, ba | B |
| #4 | sum(b1 * e1) | A | t2, aa | join(#2/ae, #6/ea) |
| #6 | sum(b1 * e1) | E– | t2 = sum(t3), ea | rollup(#7/ea) |
| #7 | b1 * e1 | E | t3 = e1 * b1, ea | join(#8/ea, #9/ae) |
| #8 | e1 | E | e1, ea | E |
| #9 | b1 | A | b1, ae | join(#2/ab, #3/ba) |
| #11 | b1 | B | b1, ba | B |
| END | | A | t1, t2 | join(#1/aa, #4/aa) |

After the references to the node IDs are updated, there are two nodes listing the relational expression join(#2/ab, #3/ba), so the mapping module merge nodes #1 and #9 as follows.

| id | expr | context | transform | relation |
|---|---|---|---|---|
| #1 | a1 * b1 | A | t1 = a1 * b1, aa, b1, ae | join(#2/ab, #3/ba) |
| #2 | a1 | A | a1, ab, aa, ae | A |
| #3 | b1 | B | b1, ba | B |
| #4 | sum(b1 * e1) | A | t2, aa | join(#2/ae, #6/ea) |
| #6 | sum(b1 * e1) | E– | t2 = sum(t3), ea | rollup(#7/ea) |
| #7 | b1 * e1 | E | t3 = e1 * b1, ea | join(#8/ea, #1/ae) |
| #8 | e1 | E | e1, ea | E |
| #9 | b1 | A | b1, ae | join(#2/ab, #3/ba) |
| END | | A | t1, t2 | join(#1/aa, #4/aa) |

The mapping module can generate a dataflow graph from the combined expression nodes (combined query plan) as follows. For every expression node in a query plan, the mapping module can generate components configured to perform operations specified by the expression nodes. The configuration of the components may include any of: selection of the component type, generation of a transformation function, selection of the key fields for a join or rollup, and generation of an output format. For example, the output format can include a record structure having a corresponding field for every attribute produced by the node.

Dependency links between expression nodes in the query plan correspond to dataflow links in the dataflow graph. In this regard, a component can receive as input the outputs of the children nodes of the corresponding expression node. For example, if an expression node E1's relation attribute specifies an expression node E1 and an input, the mapping module generates a data flow from the output port of the component corresponding to E1 to the appropriate input port of the component corresponding to E0. In situations where multiple expression nodes use outputs from the same child node, a replicate component (or equivalent) can be inserted into the dataflow graph with copies of the data from the child node provided on multiple outputs. Subsequently, each output of the replicate node can be used as input to one of the multiple expression nodes. The output of the END expression node in the example above will be connected via a data flow to a component that stores the results of the computation in an accessible location (e.g., in a file stored in the repository 104 or the external data store 112).

An example of a procedure for generating a dataflow graph corresponding to a query plan of expression nodes will have three distinct phases: generation of components, generation of data flows, and generation of data formats. However, in other examples various steps involved in these phases may be intermingled as needed, yielding equivalent results. The procedure uses working storage to store the correspondence between ports in the dataflow graph being constructed and the inputs and outputs of expression nodes, and to store the data formats associated with these ports. This information stored in the working storage can be organized in any of a variety of ways.

For example, a collection of records can be stored having the following attributes.

Expression Node ID: The identifier of an expression node.
Output Port: The output port corresponding to the value produced by the identified expression node (if any). The output port may be identified by a string of the form <component-label>.<port-name>.
Input Ports: The input ports corresponding to each expression node referenced by the relation attribute of the identified expression node (if any). In some implementations, the number of input ports depends on the type of the expression node (e.g., 0, 1, or 2 input ports in the following example).

The component generation phase generates components with associated operators corresponding to each of the expression nodes in the query plan. This phase involves the mapping module traversing the list of expression nodes in the query plan and transferring the relevant information for each of them to corresponding components of the generated dataflow graph (i.e., stored within data structures implementing those components).

Some expression nodes include a relational expression that consists of a single entity, which is classified as a "primitive relation." If data for that entity is stored in an input file, for example, the mapping module determines the name of that file and a record format associated with that file from a source such as a metadata repository. There are two different cases for generating components for expression nodes that have a primitive relation.

In a first case for generating components for expression nodes that have a primitive relation, the transform for the expression node does not define any temporary variables. In this case, the expression node is represented in the dataflow graph by an Input File component (i.e., a component with an "Input File" operator type). The Filename parameter is assigned the input file name from the metadata repository as its value. The label of the component is assigned <expression node ID> as its value. The record format of the read port is assigned the record format from the metadata repository. A record is stored in the working storage with the Expression Node ID equal to <expression node ID>, and identifies the read port of the Input File component as the Output Port.

In a second case for generating components for expression nodes that have a primitive relation, the transform for the expression node does define one or more temporary variables. In this case, the expression node is represented in the dataflow graph by an Input File component and a Reformat component. The label of the Reformat component is <expression node ID>.Reformat and the transformation function of the Reformat component is generated based on the transform of the expression node. A data flow connects the read port of the Input File component to the in port of the Reformat component. A record is stored in working storage with the Expression Node ID equal to <expression node ID>, and identifies the out port of the Reformat component as the Output Port.

The query plan in the example above has the following final set of merged expression nodes.

| id  | expr         | context | transform              | relation          |
|-----|--------------|---------|------------------------|-------------------|
| #1  | a1 * b1      | A       | t1 = a1 * b1, aa, b1, ae | join(#2/ab, #3/ba) |
| #2  | a1           | A       | a1, ab, aa, ae         | A                 |
| #3  | b1           | B       | b1, ba                 | B                 |
| #4  | sum(b1 * e1) | A       | t2, aa                 | join(#2/ae, #6/ea) |
| #6  | sum(b1 * e1) | E-      | t2 = sum(t3), ea       | rollup(#7/ea)     |
| #7  | b1 * e1      | E       | t3 = e1 * b1, ea       | join(#8/ea, #1/ae) |
| #8  | e1           | E       | e1, ea                 | E                 |
| END |              | A       | t1, t2                 | join(#1/aa, #4/aa) |

As an example of the first case, the expression node #2 in this example has a primitive relation with the single entity A. For the entity A, the metadata repository provides the following file name and record format.

| | |
|---|---|
| Filename: | A.dat |
| Format: | record |
| |    int a1, |
| |    int a2, |
| |    int a3, |
| |    int aa, |
| |    int ab, |
| |    int ae; |
| | end; |

The Input File component generated by the mapping module for this expression node #2 would be configured as follows.

| | |
|---|---|
| Operator Type: | Input File |
| Label: | #2 |
| Filename: | A.dat |
| read.format: | record |
| |    int a1, |
| |    int a2, |
| |    int a3, |
| |    int aa, |
| |    int ab, |
| |    int ae; |
| | end; |

The record stored in the working storage would include the following information.

| Expresion Node | Output Port | Input Ports |
|---|---|---|
| #2 | #2.read | |

As an example of the second case, the following is an alternative expression node (which is not in the example above).

| id | expr | context | transform | relation |
|---|---|---|---|---|
| #2 | a1 | A | a1, t = a2 * a3 | A |

The same file name and record format for entity A is assumed in this example. The Input File component and Reformat component generated by the mapping module for this expression node would be configured as follows.

```
Operator Type:  Input File
Label:          #2
Filename:       A.dat
read.format:    record
                    int a1,
                    int a2,
                    int a3,
                    int aa,
                    int ab,
                    int ae;
                end;
Operator Type:  Reformat
Label:          #2.Reformat
Transformation: out :: reformat(in) =
                    begin
                        out.a1 :: in.a1;
                        out.t  :: in.a2 * in.a3;
                    end;
```

The record stored in the working storage would include the following information.

| Expresion Node | Output Port | Input Ports |
|---|---|---|
| #2 | #2.Reformat.read | |

The record formats for the input and outputs of the Reformat component will be provided in the data format generation phase, described below.

Some expression nodes include a relational expression that consists of a join operation or a rollup operation. For these expression nodes, the mapping module generates a Join component or a Rollup component, respectively. The label of either type of component is <expression node ID>. They key fields for the join operator or the key field for the rollup operator are determined from the arguments to the operations in the relational expression. The transformation function of either type of component is generated based on the transform of the expression node. For the Join component, the mapping module determines which of the arguments to the join operation a given term in the expression node's transform comes from. A record is stored in working storage with the Expression Node ID equal to <expression node ID>, and identifies the inputs and output of the join or rollup operation as the Input Ports and Output Port of the record.

An example of generating a Join component is shown below for the expression node #1 in the example above, and an example of generating a Rollup component is shown below for the expression node #6 in the example above.

In the Join example, the final merged transform for the expression node #1 requires values for a1, b1, aa, and ae. These values are provided from either expression node #2 or expression node #3. The merged transform of the expression node #2 provides values for a1, aa, and ae, and the merged transform of the expression node #3 provides a value for b1. Based on positions of the arguments within the join operation in the relation attribute of the expression node #1, expression node #2 corresponds to the in0 port of the generated Join component, and expression node #3 corresponds to the in1 port of the generated Join component. This port assignment corresponds to the following identifiers, which may be used to configure the transformation function of the Join component.

| | |
|---|---|
| a1 | in0.a1 |
| aa | in0.aa |
| ae | in0.ae |
| b1 | in1.b1 |

For the expression node #1, the Join component generated by the mapping module would be configured as follows.

```
Operator Type:  Join
Label:          #1
Key0:           ab
Key1:           ba
Transformation: out :: join(in0, in1) =
                    begin
                        out.t1 :: in0.a1 * in1.b1;
                        out.aa :: in0.aa;
                        out.b1 :: in1.b1;
                        out.ae :: in0.ae;
                    end;
```

The record stored in the working storage would include the following information.

| Expresion Node | Output Port | Input Ports |
|---|---|---|
| #1 | #1.out | #1.in0, #1.in1 |

In the Rollup example, the final merged transform for the expression node #6 requires values for t3 and ea. These values are provided from the merged transform of expression node #7. There is a single input port labeled in, and a single output port labeled out. For the expression node #6, the Rollup component generated by the mapping module would be configured as follows.

```
Operator Type:  Rollup
Label:          #6
Key:            ea
Transformation: out :: rollup(in) =
                    begin
                        out.t2 :: sum(in.t3);
                        out.ea :: in.ea;
                    end;
```

The record stored in the working storage would include the following information.

| Expression Node | Output Port | Input Ports |
|---|---|---|
| #6 | #6.out | #6.in |

In addition to the Input File component for the expression node #2, the Join component for the expression node #1, and the Rollup component for the expression node #6, components for the other expression nodes in will be generated with the following operator types, in a similar manner as described above.

| id | Operator Type |
|---|---|
| #1 | Join |
| #2 | Input File |
| #3 | Input File |
| #4 | Join |
| #6 | Rollup |
| #7 | Join |
| #8 | Input File |
| END | Join |

After each of these components has been generated, the working storage will contain the following records.

| Expression Node | Output Port | Input Ports |
|---|---|---|
| #1 | #1.out | #1.in0, #1.in1 |
| #2 | #2.read | |
| #3 | #3.read | |
| #4 | #4.out | #4.in0, #4.in1 |
| #6 | #6.out | #6.out |
| #7 | #7.out | #7.in0, #7.in1 |
| #8 | #8.read | |
| END | END.out | END.in0, END.in1 |

Figure 10A:
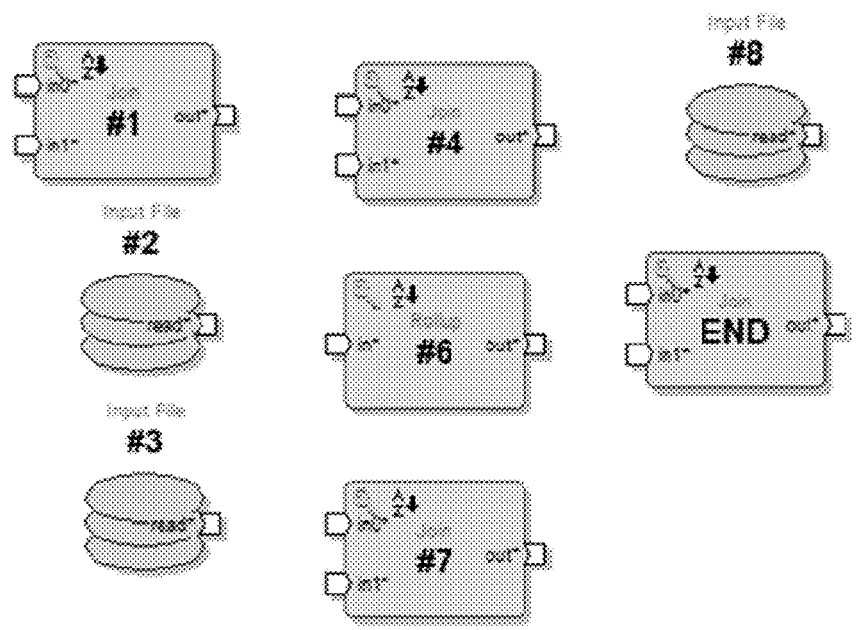
FIGS. 10A-10D show a progression for generating a dataflow graph from expression nodes.

A visual representation of the components corresponding to each of the remaining expression nodes of the merged query plan is shown in FIG. 10A, before they have been connected to each other by data flows (i.e., nodes with identifiers: #1, #2, #3, #4, #6, #7, #8, END).

Figure 10B:
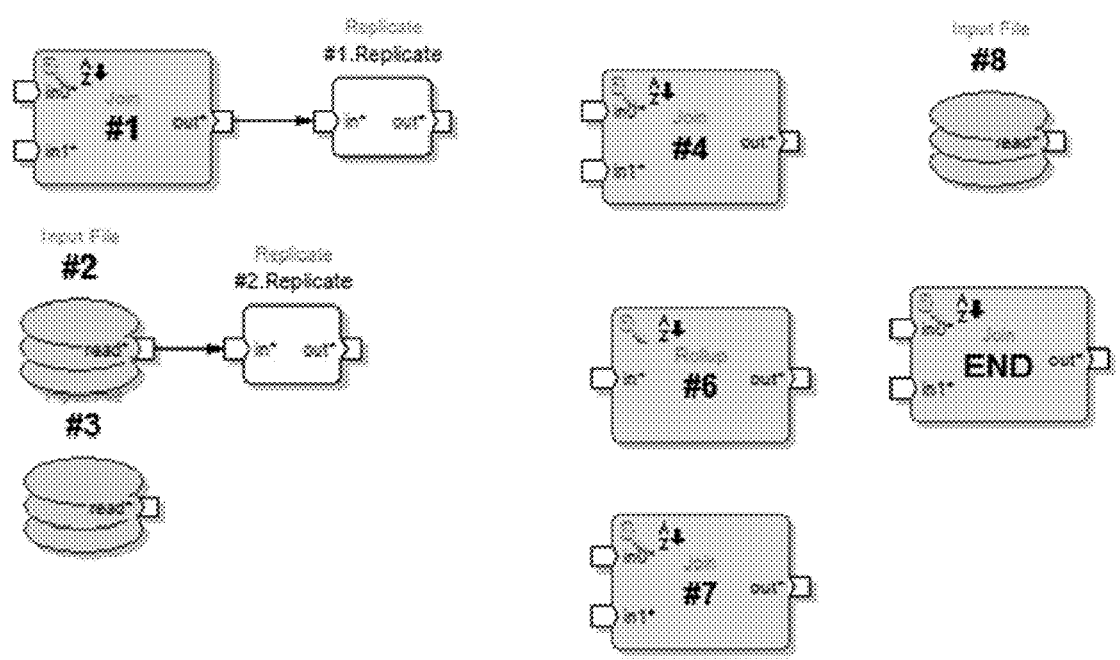

The data flow generation phase includes two procedures performed by the mapping module. In the first procedure, the mapping module inserts Replicate components at particular locations, if needed. If the identifier of a particular expression node is referenced in the relation attribute of more than one expression node, then the mapping module connects a Replicate component to the output port of the component corresponding to that particular expression node to provide the corresponding number of copies of the data flowing from that component. For example, if an expression node E is referenced by more than one other expression node, then a Replicate component labeled E.Replicate is added and a data flow is connected from the output port of E specified in working storage record to the input port of the new Replicate component, labeled E.Replicate.in. The mapping module also stores the output port of the new Replicate component, labeled E.Replicate.out, as the new value for expression node E's Output Port in the working storage record. In the example above, two expression nodes (#1 and #2) are referenced by more than one other expression node. Therefore, the mapping module applies this procedure to these two expression nodes. This results in the addition of two Replicate components (#1.Replicate and #2.Replicate) to the dataflow graph, connected to corresponding components (#1 and #2) as shown in FIG. 10B. After this procedure, the working storage will contain the following records.

| Expression Node | Output Port | Input Ports |
|---|---|---|
| #1 | #1.Replicate.out | #1.in0, #1.in1 |
| #2 | #2.Replicate.out | |
| #3 | #3.read | |
| #4 | #4.out | #4.in0, #4.in1 |
| #6 | #6.out | #6.out |
| #7 | #7.out | #7.in0, #7.in1 |
| #8 | #8.read | |

| Expression Node | Output Port | Input Ports |
|---|---|---|
| END | END.out | END.in0, END.in1 |

Figure 10C:
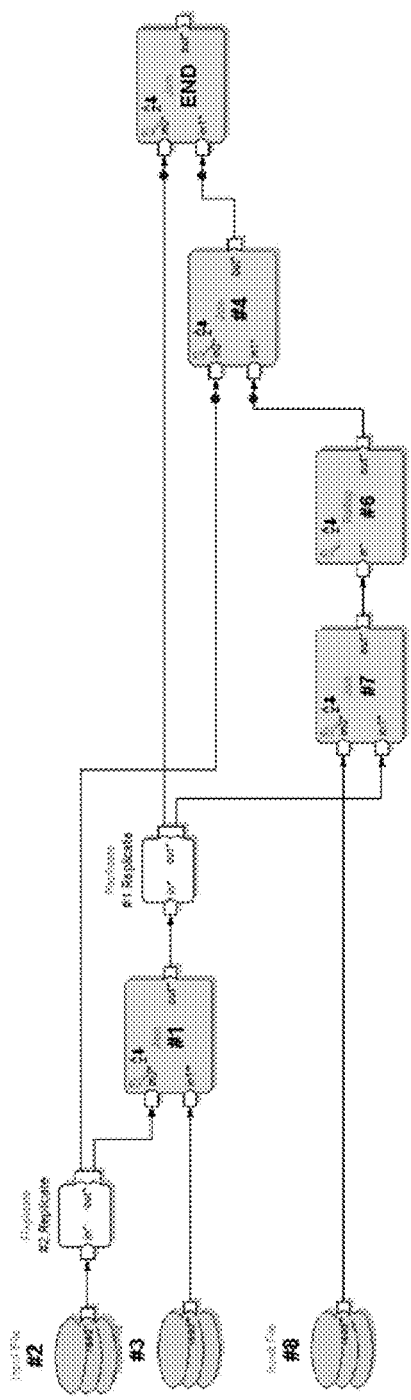

In the second procedure of the data flow generation phase, the mapping module connects ports with data flows by traversing the set of expression nodes. If the relation attribute of an expression node E1 references the identifier of another expression node E2, then the mapping module generates a data flow from the Output Port of E2, as recorded in the working storage record for E2, to the corresponding input port of E1, as recorded in the working storage record for E1. For example, the relation attribute of the expression node #4 has a join operation of expression nodes #2 and #6. Therefore, the first input port of node #4 (#4.in0) is connected to the output port of node #2 (#2.Replicate.out), and the second input of node #4 (#4.in1) is connected to the output of node #6 (#6.out). The mapping module continues this process, resulting in the dataflow graph shown in FIG. 10C. Note that while the visual representation of the dataflow graph may be presented with components arranged to provide clarity for a user, the functionality of the dataflow graph is determined by its connectivity and not the visual arrangement of components.

Figure 10D:
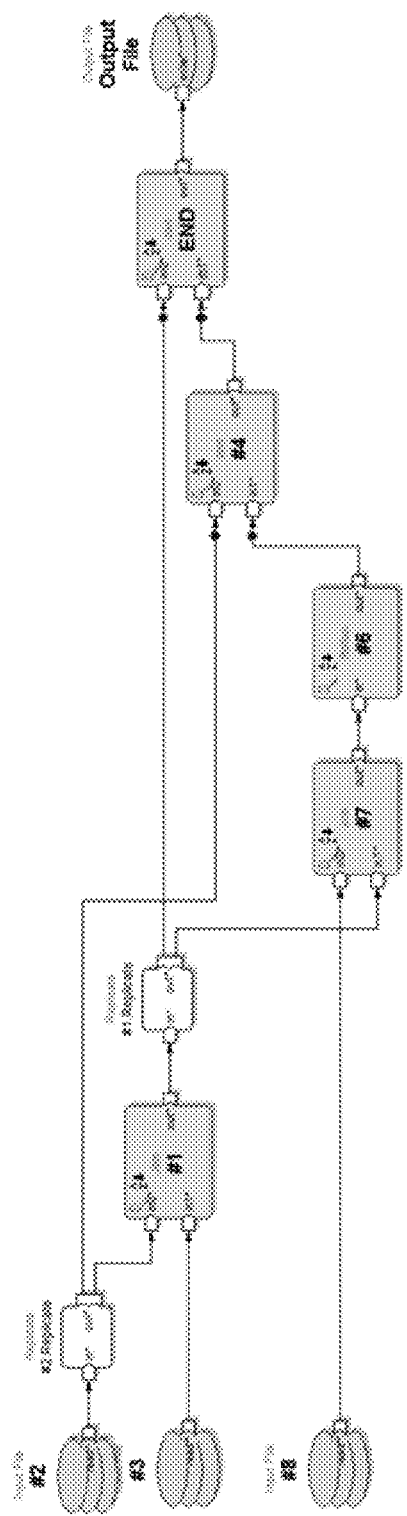

After the second procedure of the data flow generation phase, the mapping module determines whether there are any additional components to be connected to any of the existing components by data flows. For example, in some implementations, the mapping module adds a component to provide a final output produced by the dataflow graph to a desired destination (e.g., a storage medium). FIG. 10D shows the dataflow graph with an Output File component connected by a link to the Output Port of the END component, which is labeled END.out. The name of a file to be written by the Output File component may be obtained from a user or an external source such as the metadata repository.

In the record format generation phase, the mapping module generates record formats for any ports for which the record format has not yet been provided. In this example, the record formats of the Input File components (for expression nodes #2, #3, and #8) have already been obtained from the metadata repository, as follows.

| | | |
|---|---|---|
| #2.read | record | |
| | int a1, | |
| | int a2, | |
| | int a3, | |
| | int aa, | |
| | int ab, | |
| | int ae; | |
| | end; | |
| #3.read | record | |
| | int b1; | |
| | int b2; | |
| | int b3; | |
| | int ba; | |
| | end; | |
| #8.read | record | |
| | int e1; | |
| | int e2; | |
| | int ea; | |
| | end; | |

The mapping module generates record formats for other components by traversing the dataflow graph from source components (i.e., components without any input ports) to destination components (i.e., components without any output ports) and, for each component, generating an appropriate record format for the output port of that component, as described in more detail below. The record formats at the output ports of each component are then propagated (i.e., copied) to the input port connected to that output port by a data flow. For example, for the Join component #1, the record formats for its input ports in0 and in1 are the same as the record formats propagated from the two connected Input File components, respectively: in0.format=#2.read and in1.format=#3.read.

The record format of the output port of a Replicate component is the same as the record format of its input port, which is the same as the record format of the output port of the component connected to that Replicate component. So in this example, the record format for the output port of the component #2.Replicate is the following.

```
#2.Replicate.out    record
                       int a1,
                       int a2,
                       int a3,
                       int aa,
                       int ab,
                       int ae;
                    end;
```

The record format for the output port of a Join component, a Reformat component, or a Rollup component is determined by examination of the transformation function of that component. If a transformation function copies an input field to an output field, then the record format will include a type for that output field that is the same as the type of the input field. If the transformation function determines an output field based on an expression then the record format will include an output field that is suitable to hold the value returned by that expression. For example, for the transformation function of the Join component #1, shown above, the output fields out.aa, out.b1 and out.ae are copied from respective input fields in0.aa, in1.b2, and in0.ae, so the types of the output fields are the same as the types of the respective input fields. The remaining output field out.t1 is defined as the expression in0.a1*in1.b1. The product of two integers is an integer, so the type of the output field out.t1 is an integer. These determined record formats for the input and output ports yield the following completed configuration information for the Join component #1.

```
Operator Type:  Join
Label:          #1
Key0:           ab
Key1:           ba
in0.format:     record
                   int a1,
                   int a2,
                   int a3,
                   int aa,
                   int ab,
                   int ae;
                end;
in1.format:     record
                   int b1;
                   int b2;
                   int b3;
                   int ba;
                end;
out.format:     record
                   int t1;
                   int aa;
                   int b1;
```

```
                   int ae;
                end;
Transformation: out ::join(in0, in1) =
                begin
                   out.t1 :: in0.a1 * in1.b1;
                   out.aa :: in0.aa;
                   out.b1 :: in1.b1;
                   out.ae :: in0.ae;
                end;
```

This process is repeated, component-by-component, from the inputs to the outputs, until all record formats have been determined. In this example, the record format generation phase ends by determining a record format for the output port of the Join component END. In some implementations, the record format generation phase can include derivation of record formats, or other metadata for components, using techniques described in more detail in U.S. Pat. No. 7,877,350, incorporated herein by reference.

Figure 11A:
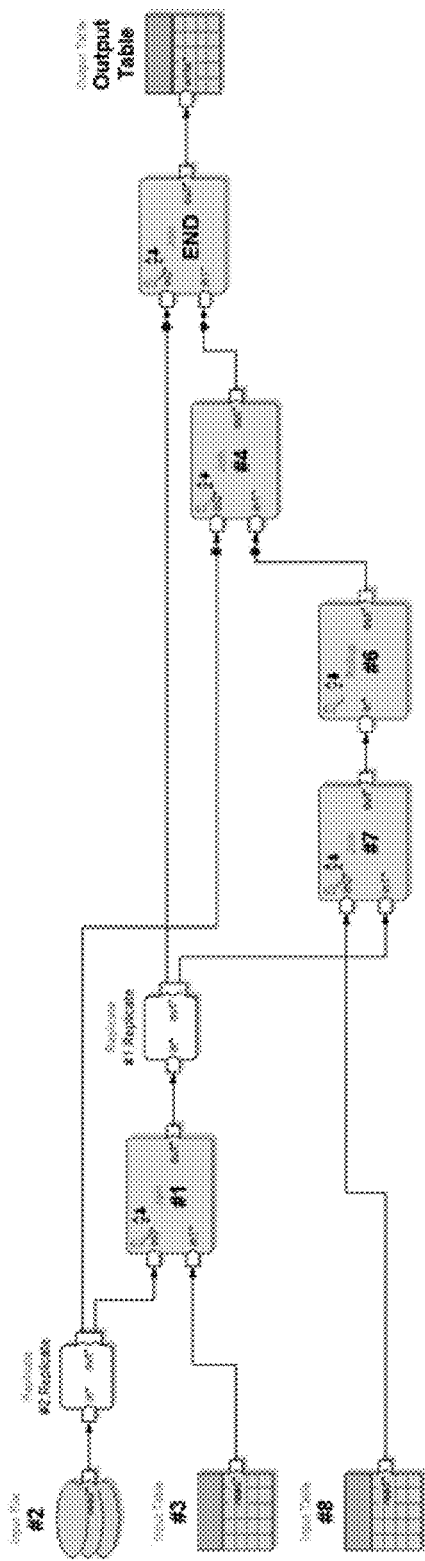
FIGS. 11A-11C show examples of configurations of a generated dataflow graph.

The specific characteristics of the generated dataflow graph may depend on a variety of characteristics of the system 100, including the location in which the data represented by the entities are stored. For example, if data represented by entities B and E are stored in a relational database, and the final output is to be stored in the relational database, then the operator types of the source components #3, and #8 would be Input Table, and the operator type of the destination component END would be Output Table. The resulting dataflow graph would include mixture of components representing files and tables, as shown in FIG. 11A.

Figure 11B:
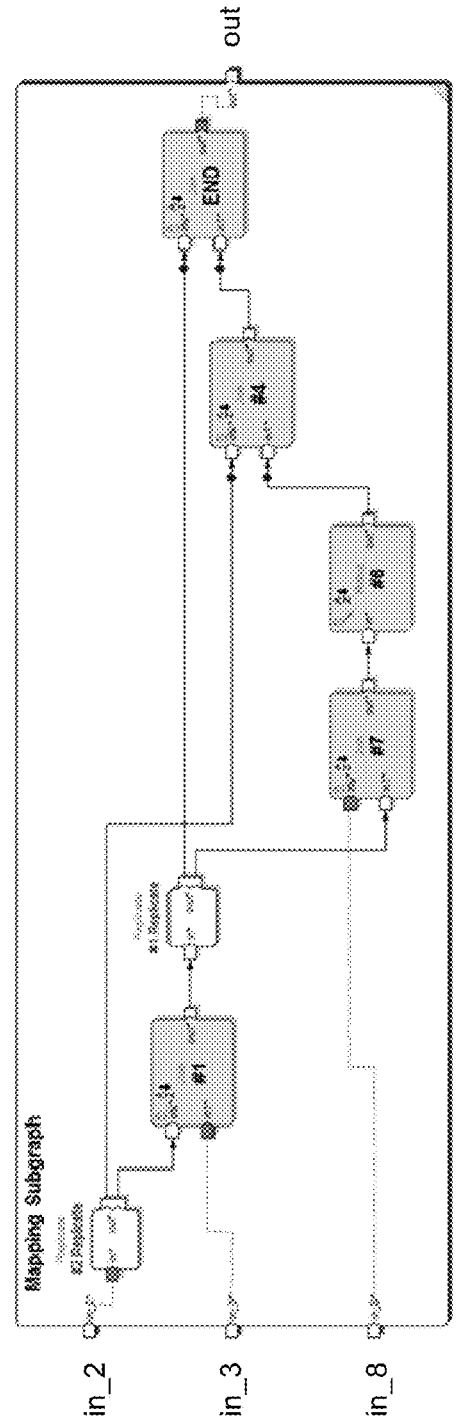
Figure 11C:
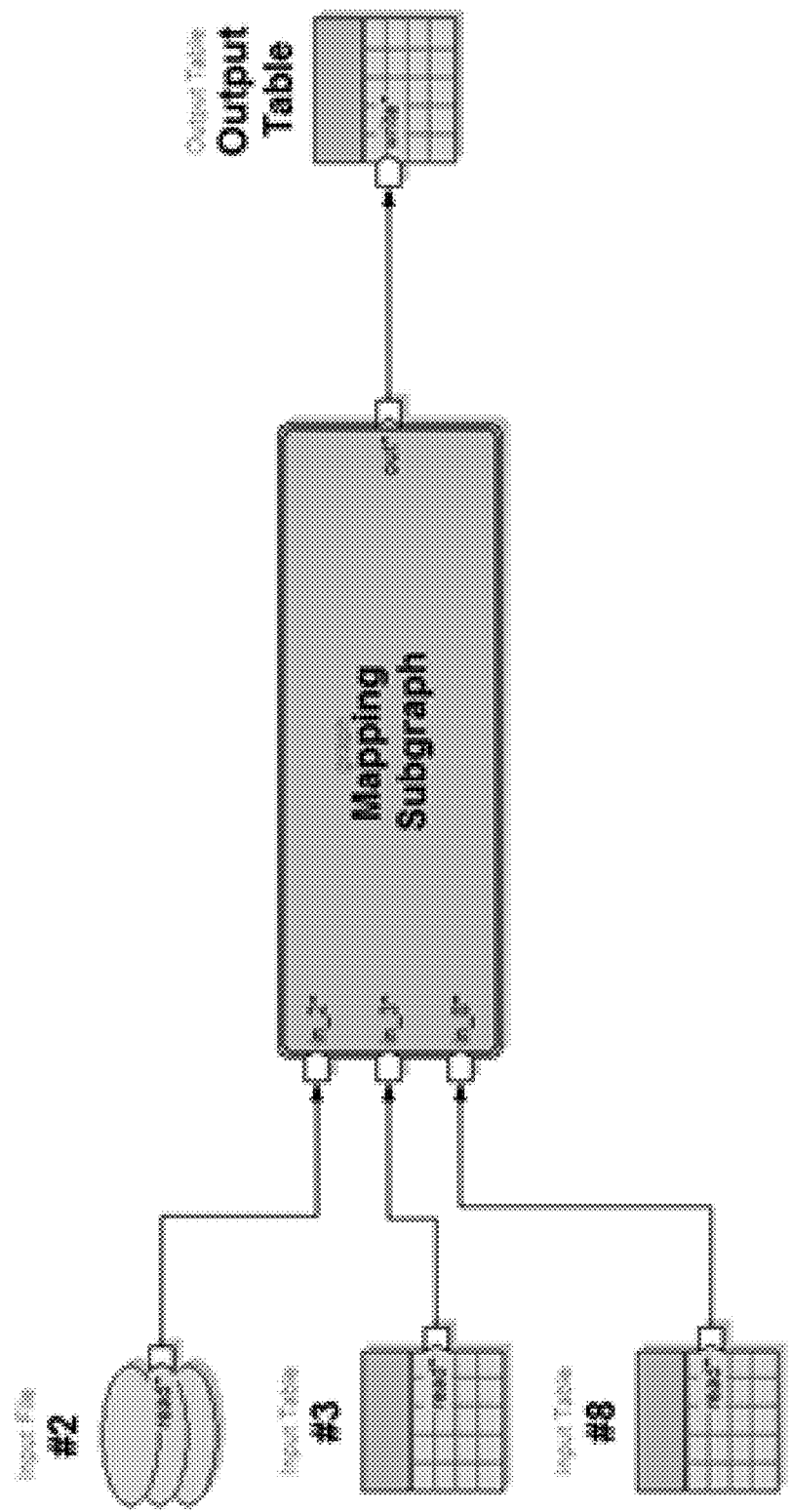

In another example, a source-to-destination mapping may appear as a "subgraph" that is connected to components within another dataflow graph by input and output ports. When generating a such a subgraph from a query plan, instead of files or tables as source and destination components, the sources and destinations would be provided as input and output ports at the boundaries of the subgraph (also called "boundary ports"), connected to the other components by data flows. So in the example above, before the component generation phase, expression nodes that have a primitive relation (i.e., #2, #3, and #8) become input boundary ports labeled "in_2", "in_3", and "in_8", connected to other components as shown in FIG. 11B. The record formats for these input boundary ports would be obtained from an external source, as in the previous example, but there is no need to obtain the location in which the data for the corresponding entity is stored. Similarly, instead of adding the Output File component or the Output Table component, the mapping module generates an output boundary port (labeled "out" in FIG. 11B) connected by a link to the Output Port of the END component. Other aspects of the procedure for generating the subgraph corresponding to the query plan of expression nodes is the same as in the phases described above. This mapping subgraph may then be connected to specific data source and destination components to form a full dataflow graph, as shown in FIG. 11C. An advantage of this subgraph approach is that a developer can manually configure the data sources, providing for additional flexibility. In addition, the mapping subgraph may be reused in the context of several different containing dataflow graphs.

In some implementations, an optional optimization step can reduce a number of components used in a resulting dataflow graph or subgraph. For example, some optimizations can include merging components that include operations that read data from the same dataset (e.g., two different fields of records in the same file).

Figure 12A:
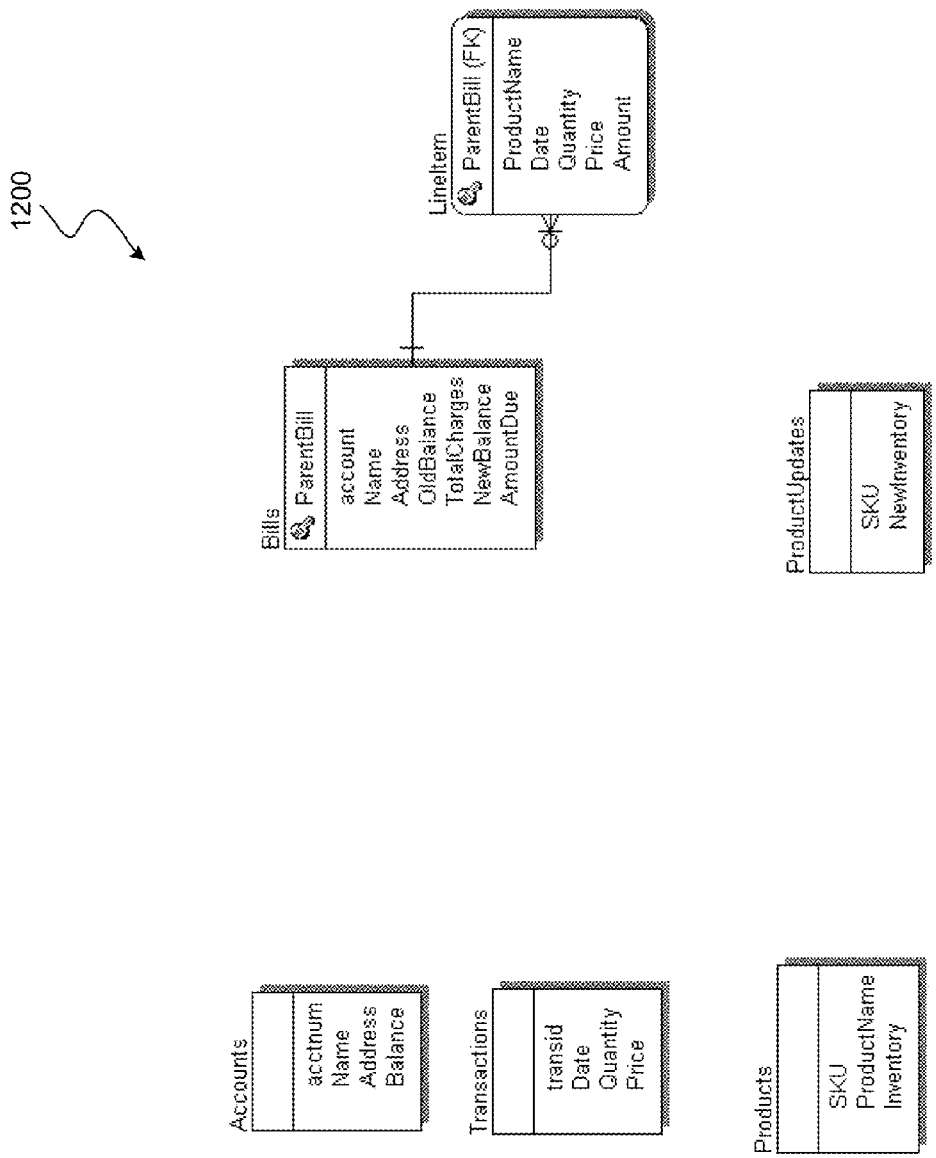
FIGS. 12A and 12B are examples of a data model.

FIG. 12A shows an example of a partial data model 1200, which includes entities Accounts, Transactions, Products, Bills, LineItem, and ProductUpdates, whose relationships will be defined according to source schemas, destination schemas, and mapping rules between the source schemas and destination schemas to be provided by a developer. The listed attributes for the entities in the data model 1200 correspond to fields of records formatted according to defined record formats. Examples of record formats for the entities Accounts, Transactions, Products, Bills, and LineItem, are shown below. In some implementations, the developer provides the following record formats, and the system 100 generates the partial data model 1200 automatically from those record formats.

```
Accounts:
record
   decimal      acctnum;
   string       Name;
   string       Address;
   decimal      Balance;
end;
Transactions:
record
   decimal      transid;
   date         Date;
   decimal      Quantity;
   decimal      Price;
end;
Products:
record
   decimal      SKU;
   string       ProductName;
   decimal      Inventory;
end;
ProductUpdates:
record
   decimal      SKU;
   decimal      NewInventory;
end;
Bills:
record
   decimal      account;
   string       Name;
   string       Address;
   decimal      OldBalance;
   decimal      Total Charges;
   decimal      NewBalance;
   decimal      AmountDue;
   record
      string    ProductName;
      date      Date;
      decimal   Quantity;
      decimal   Price;
      decimal   Amount;
   end          LineItem[ItemCount];
end;
```

Based on these record formats, the Bills entity has a primary-key/foreign-key relationship to the LineItem entity. The LineItem entity represents a vector of sub-records that include details on purchases that appear as line items in a bill record that is an instance of the Bills entity. Each bill record is assigned a unique serial number called ParentBill that can be used as a join key between instances of line items and the corresponding bills.

Figure 12B:
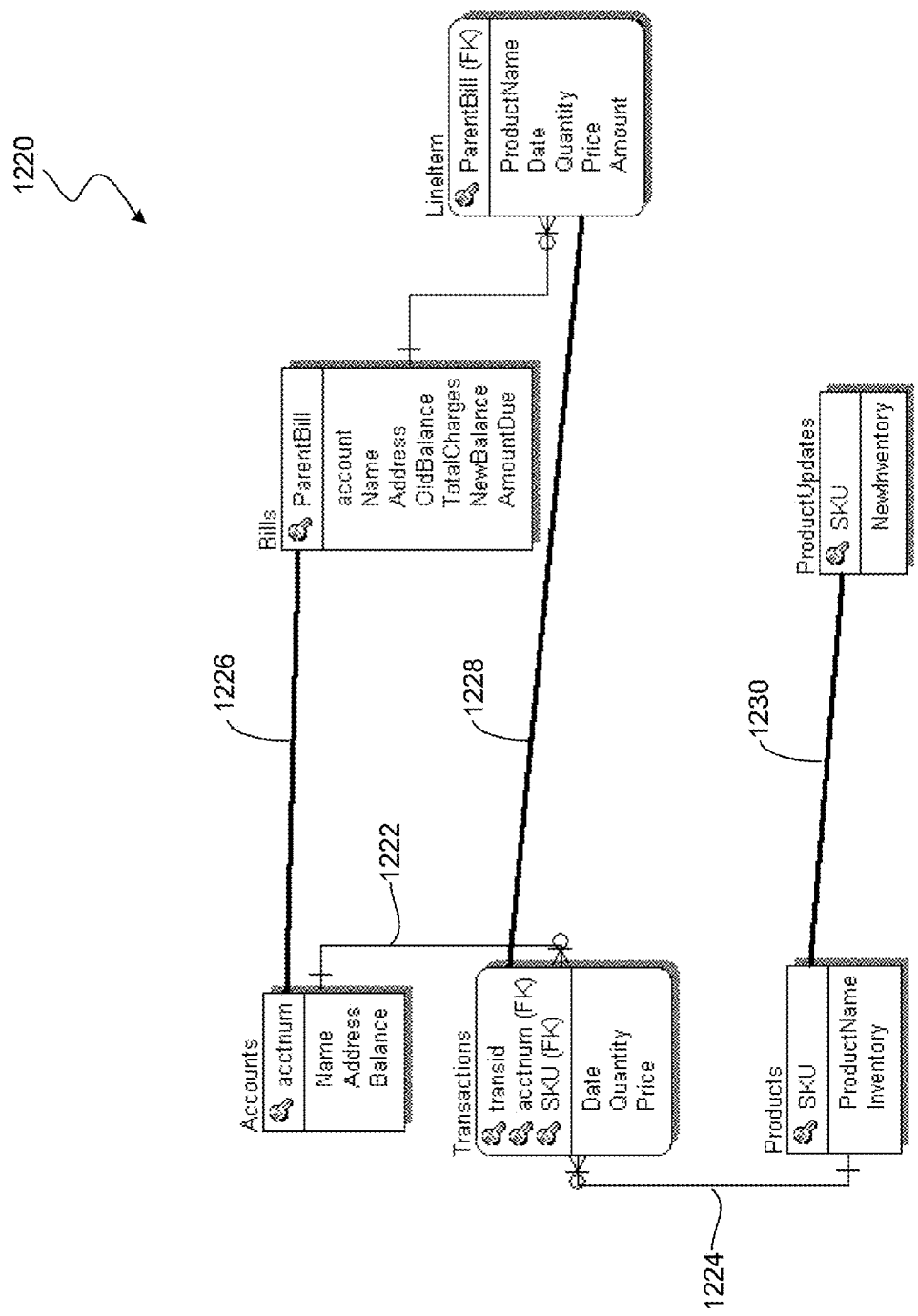

FIG. 12B shows an example data model 1220 after a developer has defined additional relationships, and has provided mapping rules between source entities and destination entities. In particular, the developer has defined a primary-key/foreign-key relationship 1222 between the Transactions entity and the Accounts entity, through a foreign key field acctnum in the Transactions entity that references the primary key field acctnum of the Accounts entity. The developer has defined a primary-key/foreign-key relationship 1224 between the Transactions entity and the Products entity, through a foreign key field SKU in the Transactions entity that references the primary key field SKU of the Products entity. The Accounts entity, Transactions entity, and Products entity together represent a source schema that can be used to define attributes of destination entities in destination schemas. The following definitions of attributes (i.e., fields) of destination entities of the data model 1220 are interpreted by the mapping module as mapping rules for generating a procedural specification, such as a dataflow graph, that is able to generate records associated with the mapped entities storing information as defined in the mapping rules.

Bills-Accounts mapping rule:
 account=acctnum;
 Name=Name;
 Address=Address;
 OldBalance=Balance;
 TotalCharges=sum(Quantity*Price);
 NewBalance=OldBalance+TotalCharges;
 AmountDue=0.1*NewBalance;
LineItem-Transactions Mapping Rule:
 ProductName=ProductName;
 Date=Date;
 Quantity=Quantity;
 Price=Price;
 Amount=Quantity*Price;
ProductUpdates-Products Mapping Rule:
 SKU=SKU;
 Newinventory=Inventory−sum(Quantity);

The Bills-Accounts mapping rule 1226 provides expressions for fields of the Bills destination entity in terms of fields of the Accounts source entity. The account field of the Bills entity is assigned the value of the acctnum field of the Accounts entity. By default the name of a field in the expression is refers to the name of a field in the source entity, so the fields Name, Address, and Balance also refer to fields of the Accounts entity. When the name of a field in the expression does not appear in the source entity, it refers to the name of a field in the destination entity, or to an entity related to the destination entity. So, the fields OldBalance, TotalCharges, and NewBalance refer to fields of the Bills entity, and the fields Quantity and Price refer to fields of the LineItem entity. The aggregation function sum( ), for a particular record of the Bills entity, computes a sum over all of the sub-records whose ParentBill foreign key value matches that of that particular record of the Bills entity.

The LineItem-Transactions mapping rule 1228 provides expressions for fields of the LineItem destination entity in terms of fields of the Transactions source entity. The Date, Quantity, and Price fields for a particular line item sub-record are assigned values of the corresponding fields in a corresponding transaction record of the Transactions entity. The Amount field for a particular line item is assigned the value of Quantity multiplied by Price of a corresponding transaction.

The ProductUpdates-Products mapping rule 1230 provides expressions for fields of the ProductUpdates destination entity in terms of fields of the Products source entity. The (primary key) SKU field for a record of the ProductUpdates entity is assigned the value of the (primary key) SKU field for a corresponding record of the Products entity. The NewInventory field is assigned an expression that depends on the Inventory field of the Products entity and on the Quantity field of the Transactions entity, which is related to the products entity.

Based on these mapping rules, the mapping module is able to generate a dataflow graph for generating records corresponding to the defined mapping rules, based on a merged query plan generated as described above. The mapping module can also generate other forms of procedural specifications from a merged query plan. For example, the relational expressions in the expression nodes of the query plan can be used to generate query expressions (e.g., SQL query expressions). The result of a relational expression of an expression node can correspond to a view definition, and if a result is linked to multiple expression nodes, a temporary table can be generated corresponding to the result. In some implementations, a combination of query expressions and dataflow graph components can be generated for different respective expression nodes.

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing data in one or more data storage systems, the method including:
    receiving mapping information that specifies one or more attributes of one or more destination entities in terms of one or more attributes of one or more source entities, at least some of the one or more source entities corresponding to respective sets of records in the one or more data storage systems; and
    processing the mapping information to generate a procedural specification for computing values corresponding to at least some of the one or more attributes of one or more destination entities, the processing including
        generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph, and
        merging at least two of the collections with each other to form a third collection based on comparing relational expressions of nodes being merged.

2. The method of claim 1, wherein the mapping information includes a first mapping rule that defines a value of an attribute of a destination entity in terms of a value of an attribute of a first source entity and a value of an attribute of a second source entity.

3. The method of claim 2, wherein a first collection of nodes associated with the first mapping rule includes: a first node representing a first relational expression including a relational algebra operation that references the first source entity and the second source entity, a second node linked to the first node representing a relational expression including the first source entity, and a third node linked to the first node representing a relational expression including the second source entity.

4. The method of claim 3, wherein the mapping information includes a second mapping rule that defines a value of an attribute of a destination entity in terms of a value of an attribute of the first source entity.

5. The method of claim 4, wherein the merging includes merging the first collection with a second collection of one or more nodes associated with the second mapping rule, including merging the second node with a node of the second collection representing a relational expression that includes the first source entity.

6. The method of claim 3, wherein the relational algebra operation is a join operation.

7. The method of claim 3, wherein the relational algebra operation is an aggregation operation.

8. The method of claim 2, wherein the first source entity and the second source entity are related according to a relationship defined in a schema.

9. The method of claim 8, wherein the schema includes multiple entities, and relationships between the entities include one or more of: a one-to-one relationship, a one-to-many relationship, or a many-to-many relationship.

10. The method of claim 1, wherein generating the procedural specification includes generating a dataflow graph from the third collection, the dataflow graph including components configured to perform operations corresponding to relational expressions in respective nodes of the third collection, and links representing flows of the records between output and input ports of components.

11. The method of claim 1, wherein generating the procedural specification includes generating a query language specification from the third collection, the query language specification including query expressions to perform operations corresponding to relational expressions in respective nodes of the third collection.

12. The method of claim 1, wherein generating the procedural specification includes generating a computer program from the third collection, the computer program including functions or expressions to perform operations corresponding to relational expressions in respective nodes of the third collection.

13. The method of claim 12, wherein the computer program is specified in at least one of the programming languages: Java, C, C++.

14. The method of claim 1, further including processing the records in the one or more data storage systems according to the procedural specification to compute values corresponding to at least some of the one or more attributes of one or more destination entities.

15. A non-transitory computer-readable storage medium storing a computer program for processing data in one or more data storage systems, the computer program including instructions for causing a computing system to:
receive mapping information that specifies one or more attributes of one or more destination entities in terms of one or more attributes of one or more source entities, at least some of the one or more source entities corresponding to respective sets of records in the one or more data storage systems; and
process the mapping information to generate a procedural specification for computing values corresponding to at least some of the one or more attributes of one or more destination entities, the processing including
generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph, and
merging at least two of the collections with each other to form a third collection based on comparing relational expressions of nodes being merged.

16. The non-transitory computer-readable storage medium of claim 15, wherein the mapping information includes a first mapping rule that defines a value of an attribute of a destination entity in terms of a value of an attribute of a first source entity and a value of an attribute of a second source entity.

17. The non-transitory computer-readable storage medium of claim 16, wherein a first collection of nodes associated with the first mapping rule includes: a first node representing a first relational expression including a relational algebra operation that references the first source entity and the second source entity, a second node linked to the first node representing a relational expression including the first source entity, and a third node linked to the first node representing a relational expression including the second source entity.

18. The non-transitory computer-readable storage medium of claim 17, wherein the mapping information includes a second mapping rule that defines a value of an attribute of a destination entity in terms of a value of an attribute of the first source entity.

19. The non-transitory computer-readable storage medium of claim 18, wherein the merging includes merging the first collection with a second collection of one or more nodes associated with the second mapping rule, including merging the second node with a node of the second collection representing a relational expression that includes the first source entity.

20. The non-transitory computer-readable storage medium of claim 19, wherein the relational algebra operation is a join operation.

21. The non-transitory computer-readable storage medium of claim 19, wherein the relational algebra operation is an aggregation operation.

22. The non-transitory computer-readable storage medium of claim 18, wherein the first source entity and the second source entity are related according to a relationship defined in a schema.

23. The non-transitory computer-readable storage medium of claim 22, wherein the schema includes multiple entities, and relationships between the entities include one or more of: a one-to-one relationship, a one-to-many relationship, or a many-to-many relationship.

24. The non-transitory computer-readable storage medium of claim 15, wherein generating the procedural specification includes generating a dataflow graph from the third collection, the dataflow graph including components configured to perform operations corresponding to relational expressions in respective nodes of the third collection, and links representing flows of the records between output and input ports of components.

25. The non-transitory computer-readable storage medium of claim 15, wherein generating the procedural specification includes generating a query language specification from the third collection, the query language specification including query expressions to perform operations corresponding to relational expressions in respective nodes of the third collection.

26. The non-transitory computer-readable storage medium of claim 15, wherein generating the procedural specification includes generating a computer program from the third collection, the computer program including functions or expressions to perform operations corresponding to relational expressions in respective nodes of the third collection.

27. The non-transitory computer-readable storage medium of claim 26, wherein the computer program is specified in at least one of the programming languages: Java, C, C++.

28. The non-transitory computer-readable storage medium of claim 15, the computer program further including instructions for causing the computing system to process the records in the one or more data storage systems according to the procedural specification to compute values corresponding to at least some of the one or more attributes of one or more destination entities.

29. A computing system including:
one or more data storage systems;
an input device or port receiving mapping information that specifies one or more attributes of one or more destination entities in terms of one or more attributes of one or more source entities, at least some of the one or more source entities corresponding to respective sets of records in the one or more data storage systems; and
at least one processor configured to process the mapping information to generate a procedural specification for computing values corresponding to at least some of the one or more attributes of one or more destination entities, the processing including
generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph, and
merging at least two of the collections with each other to form a third collection based on comparing relational expressions of nodes being merged.

30. The computing system of claim 29, wherein the mapping information includes a first mapping rule that defines a value of an attribute of a destination entity in terms of a value of an attribute of a first source entity and a value of an attribute of a second source entity.

31. The computing system of claim 30, wherein a first collection of nodes associated with the first mapping rule includes: a first node representing a first relational expression including a relational algebra operation that references the first source entity and the second source entity, a second node linked to the first node representing a relational expression including the first source entity, and a third node linked to the first node representing a relational expression including the second source entity.

32. The computing system of claim 31, wherein the mapping information includes a second mapping rule that defines a value of an attribute of a destination entity in terms of a value of an attribute of the first source entity.

33. The computing system of claim 32, wherein the merging includes merging the first collection with a second collection of one or more nodes associated with the second mapping rule, including merging the second node with a node of the second collection representing a relational expression that includes the first source entity.

34. The computing system of claim 31, wherein the relational algebra operation is a join operation.

35. The computing system of claim 31, wherein the relational algebra operation is an aggregation operation.

36. The computing system of claim 30, wherein the first source entity and the second source entity are related according to a relationship defined in a schema.

37. The computing system of claim 36, wherein the schema includes multiple entities, and relationships between the entities include one or more of: a one-to-one relationship, a one-to-many relationship, or a many-to-many relationship.

38. The computing system of claim 29, wherein generating the procedural specification includes generating a dataflow graph from the third collection, the dataflow graph including components configured to perform operations corresponding to relational expressions in respective nodes of the third collection, and links representing flows of the records between output and input ports of components.

39. The computing system of claim 29, wherein generating the procedural specification includes generating a query language specification from the third collection, the query language specification including query expressions to perform operations corresponding to relational expressions in respective nodes of the third collection.

40. The computing system of claim 29, wherein generating the procedural specification includes generating a computer program from the third collection, the computer program including functions or expressions to perform operations corresponding to relational expressions in respective nodes of the third collection.

41. The computing system of claim 40, wherein the computer program is specified in at least one of the programming languages: Java, C, C++.

42. The computing system of claim 29, the at least one processor further configured to process the records in the one or more data storage systems according to the procedural specification to compute values corresponding to at least some of the one or more attributes of one or more destination entities.

43. A computing system including:
one or more data storage systems;
means for receiving mapping information that specifies one or more attributes of one or more destination entities in terms of one or more attributes of one or more source entities, at least some of the one or more source entities corresponding to respective sets of records in the one or more data storage systems; and
means for processing the mapping information to generate a procedural specification for computing values corresponding to at least some of the one or more attributes of one or more destination entities, the processing including
generating a plurality of collections of nodes, each collection including a first node representing a first relational expression associated with an attribute specified by the mapping information, and at least some collections forming a directed acyclic graph that includes links to one or more other nodes representing respective relational expressions associated with at least one attribute of at least one source entity referenced by a relational expression of a node in the directed acyclic graph, and
merging at least two of the collections with each other to form a third collection based on comparing relational expressions of nodes being merged.

44. The computing system of claim 43, wherein the mapping information includes a first mapping rule that defines a value of an attribute of a destination entity in terms of a value of an attribute of a first source entity and a value of an attribute of a second source entity.

45. The computing system of claim 44, wherein a first collection of nodes associated with the first mapping rule includes: a first node representing a first relational expression including a relational algebra operation that references the first source entity and the second source entity, a second node linked to the first node representing a relational expression including the first source entity, and a third node linked to the first node representing a relational expression including the second source entity.

46. The computing system of claim 45, wherein the mapping information includes a second mapping rule that defines a value of an attribute of a destination entity in terms of a value of an attribute of the first source entity.

47. The computing system of claim 46, wherein the merging includes merging the first collection with a second collection of one or more nodes associated with the second mapping rule, including merging the second node with a node of the second collection representing a relational expression that includes the first source entity.

48. The computing system of claim 45, wherein the relational algebra operation is a join operation.

49. The computing system of claim 45, wherein the relational algebra operation is an aggregation operation.

50. The computing system of claim 44, wherein the first source entity and the second source entity are related according to a relationship defined in a schema.

51. The computing system of claim 50, wherein the schema includes multiple entities, and relationships between the entities include one or more of: a one-to-one relationship, a one-to-many relationship, or a many-to-many relationship.

52. The computing system of claim 43, wherein generating the procedural specification includes generating a dataflow graph from the third collection, the dataflow graph including components configured to perform operations corresponding to relational expressions in respective nodes of the third collection, and links representing flows of the records between output and input ports of components.

53. The computing system of claim 43, wherein generating the procedural specification includes generating a query language specification from the third collection, the query language specification including query expressions to perform operations corresponding to relational expressions in respective nodes of the third collection.

54. The computing system of claim 43, wherein generating the procedural specification includes generating a computer program from the third collection, the computer program including functions or expressions to perform operations corresponding to relational expressions in respective nodes of the third collection.

55. The computing system of claim 54, wherein the computer program is specified in at least one of the programming languages: Java, C, C++.

56. The computing system of claim 43, further including means for processing the records in the one or more data storage systems according to the procedural specification to compute values corresponding to at least some of the one or more attributes of one or more destination entities.

* * * * *